(12) United States Patent
Ghetie

(10) Patent No.: US 12,265,613 B2
(45) Date of Patent: Apr. 1, 2025

(54) SYSTEM AND METHODS FOR FAULT INJECTION ATTACK PROTECTION

(71) Applicant: SDG Logic Inc., Hillsboro, OR (US)

(72) Inventor: Sergiu Ghetie, Hillsboro, OR (US)

(73) Assignee: SDG Logic Inc., Hillsboro, OR (US)

( * ) Notice: Subject to any disclaimer, the term of this patent is extended or adjusted under 35 U.S.C. 154(b) by 192 days.

(21) Appl. No.: 17/826,019

(22) Filed: May 26, 2022

(65) Prior Publication Data

US 2023/0129830 A1    Apr. 27, 2023

Related U.S. Application Data

(60) Provisional application No. 63/197,150, filed on Jun. 4, 2021.

(51) Int. Cl.
*G06F 21/55* (2013.01)
*G06F 21/64* (2013.01)

(52) U.S. Cl.
CPC ............ *G06F 21/554* (2013.01); *G06F 21/64* (2013.01); *G06F 2221/033* (2013.01)

(58) Field of Classification Search
CPC ... G06F 21/554; G06F 21/64; G06F 2221/033
See application file for complete search history.

(56) References Cited

U.S. PATENT DOCUMENTS

| | | | |
|---|---|---|---|
| 2009/0183056 A1* | 7/2009 | Aston | G06F 11/1004 714/799 |
| 2018/0139039 A1* | 5/2018 | Liu | H04L 9/0894 |
| 2022/0164297 A1* | 5/2022 | Sity | G06F 12/0802 |

FOREIGN PATENT DOCUMENTS

CN          106326053 A  *  1/2017  .......... G06F 11/2268

* cited by examiner

*Primary Examiner* — Ayoub Alata
(74) *Attorney, Agent, or Firm* — Polsinelli LLP

(57) ABSTRACT

Aspects of the present disclosure involve systems, methods, apparatus, and computer-readable media for mitigating laser-based fault injection attacks against one or more processing devices. Techniques may include generating a corresponding representation of at least one of data or a component of a processing device, locating the corresponding representation on a die of the processing device adjacent to a location on the die of at least one of the data or the component, and executing, based on a determination that the corresponding representation is different than at least one of the data or the component of the processing device, a mitigation procedure. One example may include hashing, using a secure hashing function, security data to generate integrity data corresponding to the security data and storing the security data and the integrity data in adjacent memory locations in a memory device.

18 Claims, 11 Drawing Sheets

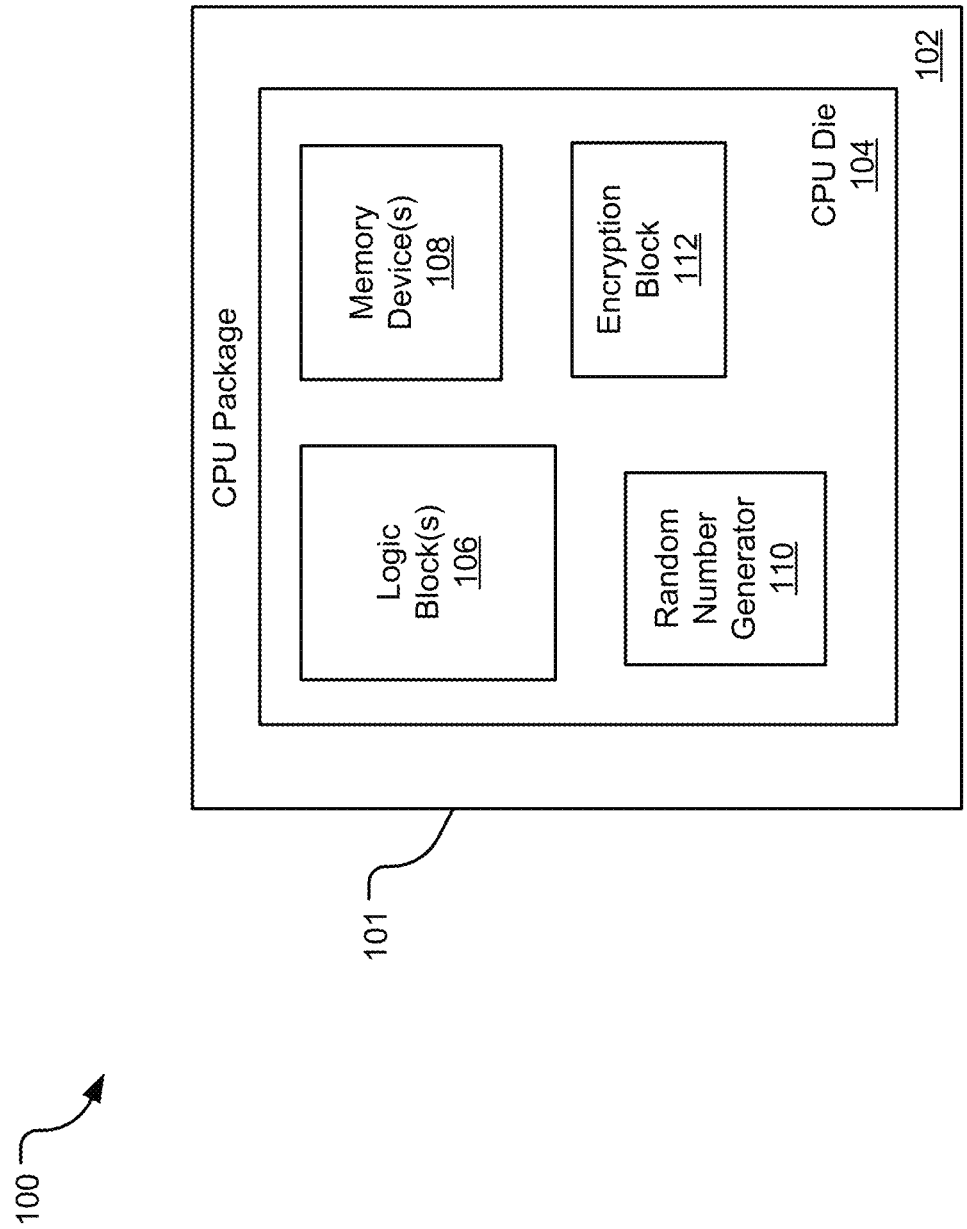

SYSTEM AND METHODS FOR FAULT INJECTION ATTACK PROTECTION

CROSS-REFERENCE TO RELATED APPLICATIONS

This application is related to and claims priority under 35 U.S.C. § 119(e) to U.S. Patent Application No. 63/197,150, filed Jun. 4, 2021, entitled "System and Methods For Fault Injection Attack Protection," the entire contents of which is incorporated herein by reference for all purposes.

TECHNICAL FIELD

The present disclosure generally relates to confidential computing systems with secure protection against fault injection attacks on the computing systems.

BACKGROUND

Confidential computing can refer to secure (e.g., physically secure) computing where software or firmware executed on computing resources are able to securely communicate with local or remote devices while maintaining the integrity of the data being transmitted. However, computing systems may be subject to fundamental flaws that result in security vulnerabilities being introduced at an alarming rate. Critical infrastructure, cloud, and edge services are particularly vulnerable to security vulnerabilities, with datacenters comprised of thousands or tens of thousands of systems make it easier for attackers to mount large-scale attacks to take the complete control of these systems or to inflict permanent denial of service as part of cyber-security warfare.

The laser fault injection attack is one of the most powerful physical attacks against computing systems that may include Central Processing Units (CPUs) or other processing devices of extreme complexity (e.g., including billions of transistors) and that are manufactured in smaller and smaller geometries (e.g., 14 nanometers (nm), 10 nm, 7 nm, etc.). Such an attack can be powerful due to the ability of the attack to compromise the physical security of targeted silicon of the CPU or other processing device. Further, laser fault injection attacks present a real possibility of persistent and currently undetectable physical attack-based rootkits that may represent the future of cyber-security warfare (e.g., by performing a complete bypass of supply chain security and complete local and/or remote control of the infected silicon). Highly-skilled attackers can leverage laser fault injection attacks to easily compromise the critical CPU (and/or other processing device(s)) security assets. Such attacks may be easy to use through the ease of use, control of injection time, very precise and accurate control of localization, very precise and accurate control of the targets (e.g., transistors) (which can become worse with lower manufacturing nodes), and more. Fault injection is an easy, reproducible, and low-cost attack that provides both high versatility (laser frequency, power, pulse time, electromagnetic radiation detectors, etc.) with simple equipment operation. As such, such attacks are not a deterrent to attackers on potentially highly-sensitive computing systems.

Laser fault injection attacks against a CPU or other processing device can result in an attacker completely compromising the physical security of the CPU silicon (and beyond) and installing persistent and undetectable rootkits, thus resulting in the creation of a highly sophisticated cyber-security attack. Aspects are described herein that address these observations, among others.

BRIEF SUMMARY

Disclosed are systems, apparatuses, methods, and computer-readable media for implementing a fault injection attack mitigation technique. The technique may include such operations as generating a corresponding representation of an aspect of a central processing unit (CPU) or other processing device, locating the corresponding representation on a die of the CPU (or other processing device) adjacent to a location on the die of the aspect of the CPU or other processing device, and executing, based on a determination that the corresponding representation is different than the aspect of the CPU (or other processing device), a mitigation procedure by the CPU (or other processing device).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The foregoing and other objects, features, and advantages of the present disclosure set forth herein should be apparent from the following description of particular aspects of those inventive concepts, as illustrated in the accompanying drawings. The drawings depict only typical aspects of the present disclosure and, therefore, are not to be considered limiting in scope.

FIG. 1 is a schematic diagram illustrating an example of a computing environment, in accordance with aspects of the disclosure.

DETAILED DESCRIPTION

Figure 2A:
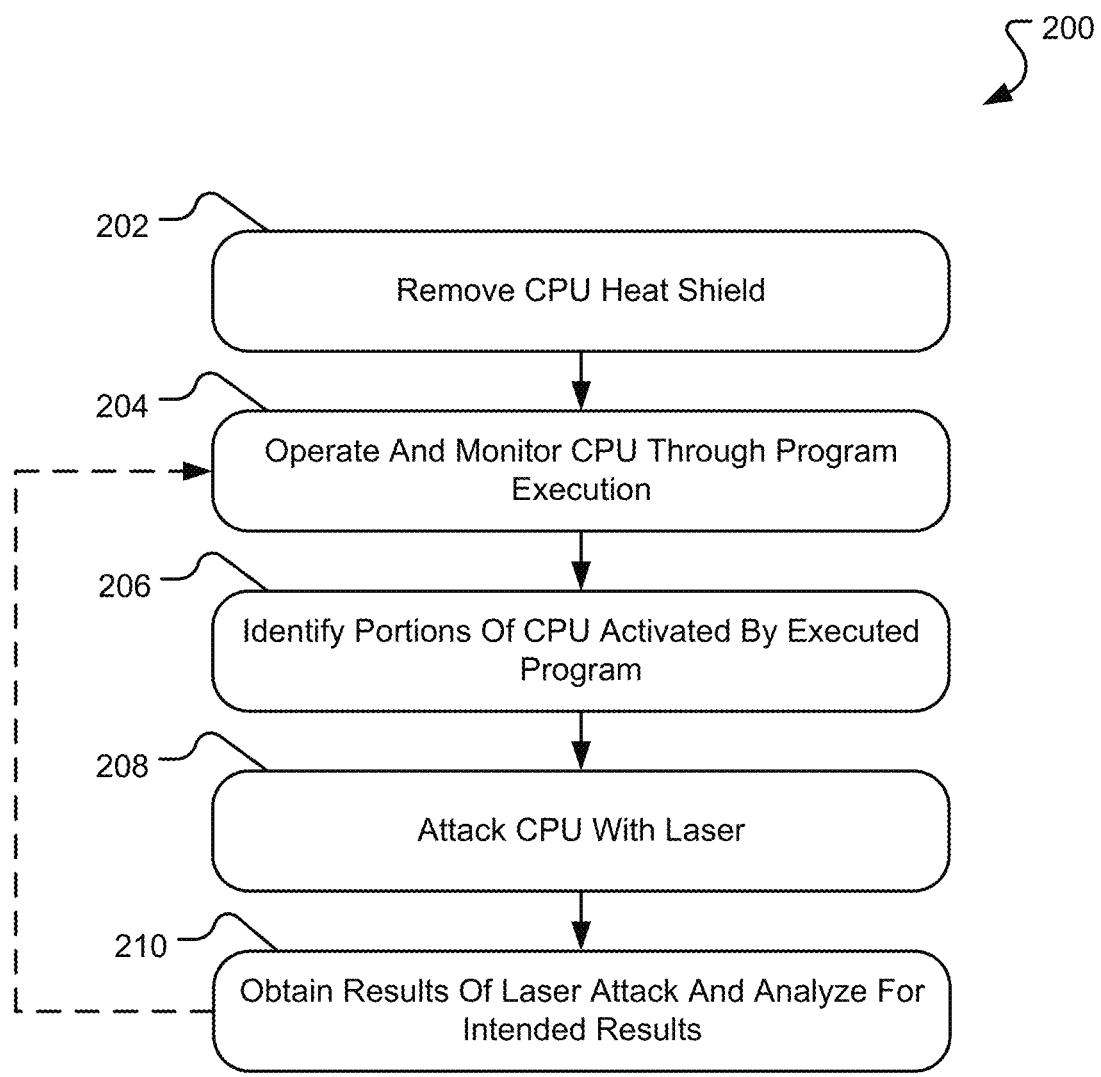
FIG. 2A is a flowchart illustrating an example of a method (or process) for executing a fault injection attack on a processing device, in accordance with aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application.

Aspects of the present disclosure involve systems and methods for mitigating laser-based fault injection attacks against one or more processing devices (e.g., a computer chip or chips that can process data). Examples of a processing device include, but are not limited to, a central processing unit (CPU), graphics processing unit (GPU), neural processing unit (NPU), video card, sound card, memory controllers, digital signal processor (DSP), vision processing unit (VPU), artificial Intelligence (AI) accelerators, storage devices (e.g., SSDs, HDDs), network devices (wired, wireless), dynamic random-access memory (DRAM) or persistent memory devices connected to other system devices via point-to-point interfaces or fabrics, and/or any other processing devices in a computer that interprets and manipulates data. Generally, laser-based fault injection attacks can include an attacker using a combination of software techniques and electromagnetic radiation detectors to isolate and identify the active areas of the silicon of the CPU that is triggered by a specific software sequence. The attacker can then program a laser device with various parameters (e.g., frequency, power, pulse time, 2D position, etc.) and mount the attack by using the laser device to affect the devices of the CPU through a photoelectric effect. In general, the photoelectric effect is an emission of electrons from a material when electromagnetic radiation, such as light of certain frequencies and power, strikes the surface. Applying laser light from a laser device to one or more components of the CPU can generate this emission of electrons resulting in behavior changes of one or multiple transistors and/or other components of the CPU (e.g., one or more transistor values may be cleared from a value of 1 to a value of 0 or set from a value of 0 to a value of 1). Through these attacks and based on modifying the behavior of the CPU components (e.g., one or more transistors), a malicious actor may monitor and/or control the operation of the CPU. For instance, an attacker may modify the transistor(s) of a CPU, which can allow the attacker to monitoring data processed by the CPU and, in some cases, to take over complete control of the CPU and any programs or software executed on the CPU.

Systems, apparatuses, methods (also referred to as processes), and computer-readable media (collectively referred to as "mitigation systems and techniques") for mitigating fault injection attacks are described herein. The mitigation systems and techniques can take advantage that a diameter of the laser beam (or laser spot) when striking the processing device used in the attack (also referred to as the "laser spot") may be larger than the relatively small size of the one or more transistors and/or components of the CPU. In particular, many CPU designs include components (such as transistors, logic gates, etc.) that are several nanometers (nm) wide. By comparison, certain laser attacks have a 1 micrometer (μm) or larger laser spot that is projected onto the silicon, or "die", of the CPU. The one or more components of the CPU may be mounted on the die of the CPU, as explained in more detail below, and may therefore be susceptible to a photoelectric effect generated from the laser spot being targeted onto the CPU. Because the size of the one or more CPU components may be smaller than the diameter of the laser spot, an emitted laser beam directed onto the silicon of the CPU may impact multiple components of the CPU, causing multiple transistor or other component behavior changes. In some aspects, the mitigation systems and techniques discussed herein therefore may include storing data integrity information for security-sensitive data in the same memory array as the security-sensitive data. In general, security-sensitive data may include any data processed or stored by the CPU that provides some level of control of the CPU, such as data stored in one or more registers, encryption key data, data used by firmware or other programs to verify the identity of a component of the CPU, and the like. Data integrity information may include some type of reproducible conversion of the data or another aspect of the security-sensitive data that may include a portion of the data, a conversion of the data utilizing some conversion process (such as a hashing function, an error correction code technique, and the like), the entirety of the data, a combination of converted data and the data, and the like. By storing the security-sensitive data and the integrity information in the same memory array, fault injection attacks on the security-sensitive data may also affect the corresponding integrity data such that the integrity data may no longer authenticate the security-sensitive data. For example, a secure hash of the security-sensitive data may be generated by a program of the CPU and stored in the same memory array the security-sensitive data itself. In some instances, the secure hash may be interleaved with the security-sensitive data. Upon a request for the security-sensitive data from an executed program, a security block of the CPU may obtain the security-sensitive data, generate the secure hash, and compare the results to the stored secure hash of the data. As a fault injection attack would alter the secure hash of the data due to the storage of the hash near the targeted security-sensitive data, the generated secure hash of the data would not match the stored secure hash. In this manner, a fault injection attack on the security-sensitive data may be detected by the secure block of the CPU and the CPU may be prevented from processing the attacked data. This mitigation technique may be applied to static security-sensitive data, dynamic security-sensitive data, or both static and dynamic security-sensitive data. In some cases, the mitigation technique may be applied to can additionally or alternatively be applied to data used for performance-critical processes and/or nonperformance-critical processes.

In another example, logic gates or a block or blocks of logic gates within the CPU may be attacked through the fault injection attack described above. To mitigate attacks of this kind on a logic block, the CPU may include one or more redundant logic blocks that mirror the function of the logic block. For example, a redundant logic block may include the same types of logic gates interconnected in the same manner as the logic block such that each redundant logic block processes data similarly as the corresponding logic block. In some cases, the logic gates of a redundant logic block (or multiple redundant logic blocks) may be located on the CPU die intertwined with the logic gates of the logic block. In such cases, a laser fault injection attack would affect gates of both the logic block and the one or more redundant logic blocks. In other examples, the redundant logic block may be located on the CPU die next to or in the near vicinity of the logic block. In general, near vicinity may refer a distance that is less than a diameter of a laser spot used in a fault injection attack. However, examples in which multiple redundant logic blocks are included on the CPU die, the redundant logic block and the corresponding logic block may be located within any distance on the CPU die. For instance, in some cases, multiple redundant logic blocks can be included that operate either in lockstep or with fixed or random delays with respect to a main logic block. The multiple redundant logic blocks can help mitigate the laser fault injection attacks as it becomes increasingly difficult for an attacker to mount multiple synchronous or asynchronous laser fault injection attacks (e.g., multiple laser beams with the appropriate timing targeting a very small die area have to be used to make the attack successful).

Outputs from the logic block and the one or more redundant logic blocks may be compared to verify and authenticate that the data processed by the logic block has not been tampered with from a fault injection attack during the processing of the data. Thus, by locating the logic gates of the logic block and the redundant logic block within the same area on the CPU die, changes made to the output from the logic block due to a fault injection attack may be detected and one or more techniques may be employed to prevent the attack from negatively affecting the operation of the CPU.

As summarized above, the systems and methods described herein provide for identification and mitigation of fault injection attacks on a CPU device, microprocessor, or other processing device (e.g., a CPU, GPU, NPU, video card, sound card, memory controllers, and/or any other processing devices) in a computer that interprets and manipulates data. These and other advantages over the present state of the art of CPU or other processing device security will be apparent from the present disclosure.

Various aspects of the application will be described with respect to the figures. FIG. 1 is a schematic diagram illustrating an example of a computing environment 100 in accordance with one illustrative example. The environment 100 may include a central processing unit (CPU) 101 or microprocessor that includes a CPU package 102 on which a CPU die 104 may be mounted or included. In general, the terms CPU, microprocessor, processing device, and the like are used interchangeably throughout this document. Further, although described herein as a CPU 101, it should be appreciated that any type of processing device may be included in the environment 100 to which the methods described herein may be applied. In general, any computing device on which a software or firmware program may be executed may be included in the environment 100.

The CPU 101 may include one or more functional blocks comprising components of the CPU and mounted on and interconnected through the CPU die 104. The components 106-112 of the CPU 101 may comprise any number of electrical devices, including but not limited to transistors, capacitors, inductors, resistors, logic gates, memory cells, and the like. Further, the electrical devices of the components 106-112 may be interconnected through any electrical communication device, such as connecting wires, conductive vias or wells through the CPU die 104, and the like. Those of ordinary skill in the art may be aware of the many different types of electrical devices and interconnections that may be implemented within a CPU 101 to form a CPU component, which are not illustrated in FIG. 1 nor discussed in further detail for ease of understanding of the environment 100.

The CPU 101 may include any number of functional blocks (e.g., one or more logic blocks 106, one or more memory devices 108 (referred to as memory device(s) 108), random number generator 110, encryption block 112, and/or other functional blocks) that are configured to process data and execute software programs, including firmware programs. For example, the CPU 101 may include one or more logic blocks 106 comprising any number of logic gates or other logic electrical devices interconnected to process input data into output data. The design of the logic block 106 may be determined during a design phase of the CPU 101 to provide a particular processing of input data during the execution of a software program by the CPU. The CPU 101 may also include some type of on-die memory, such as memory device(s) 108. The memory device(s) 108 may include or be one or more types of volatile memory, non-volatile memory, and/or other type of memory. For instance, the memory device(s) 108 can include one or more Dynamic Random-Access Memory (DRAM) devices, one or more Static Random-Access Memory (SRAM) devices, one or more other volatile and/or non-volatile memory devices, any combination thereof, and/or any other memory device(s). The CPU 101, and, more particularly software executed by the CPU, may utilize the memory device(s) 108 to store data for use by the executing programs. In one particular example, a Basic Input/Output System (BIOS) program executed by the CPU 101 may store data associated with the operation of the CPU, including one or more security keys, register files, CPU operational states, and the like. One or more programs or functions may be executed to aid the CPU 101 in managing the storage and retrieval of data from the memory device(s) 108.

Other functional blocks may also be included in the CPU 101. In one illustrative example, the CPU 101 may include a random number generator 110 configured or designed to generate a random number and/or an encryption block 112 configured or designed to generate encryption keys or key pairs and perform encryption, decryption, digital signature generation, digital signature verification and other cryptographic operations. The random number generator 110 and the encryption block 112 may operate to encrypt data stored in the memory device(s) 108. For example, the random number generator 110 may provide a random number to the encryption block 112 as a seed for generating one or more encryption keys for use in encrypting data. Encrypted data retrieved from the memory device(s) 108 may also be decrypted by the encryption block 112 or another block of the CPU 101. As with the other functional blocks, the random number generator 110 may include one or more electrical devices that are susceptible to a fault injection attack using a laser. For example, the fault injection attack may cause the random number generator 110 to always output a fixed (stuck) number from which encryption keys are generated. Through this attack, the fixed (stuck) encryption key generated by the encryption block 112 may be used multiple times instead of random encryption keys and eventually leaked through other attacks such as differential power analysis attacks to a software program executed by the CPU 101 that provides unauthorized access to the CPU operation to the executed program. In a similar manner, the encryption block 112 may also be manipulated through a fault injection attack to generate a known encryption key that may then be used by an attacker to gain control over the CPU operations.

One or more other components may be included in the CPU 101, which may include but are not limited to, system agents, cores, graphic controllers, control units, arithmetic logic units, registers, caches, memory controllers, buses, clocks, any combination thereof, and/or other components. The CPU 101 may include more or fewer than the components noted herein, which are not illustrated to ease of understanding. One or more of the functional blocks of the CPU 101 not illustrated may similarly be vulnerable to fault injection attacks to gain access to the operation of the CPU 101. The block 106-112 illustrated in FIG. 1 are provided as example blocks for demonstration of the fault injection mitigation techniques and methods described herein.

CPUs, like that of FIG. 1, and/or other processing devices or microprocessors are often not designed with security in mind from scratch. Rather, security is added on top of existing designs after years and years of evolution that creates legacy in the chip design and without an in-depth understanding of the interactions between the old functionality and the new security capabilities. Building security on top of a weak foundation is the recipe for products prone to serious security vulnerabilities that can be linked in attacks, resulting in the attackers taking control of the target platform via attacks coming from the network (software attacks), attacks resulting from physical possession by the attackers (physical attacks), or in permanent denial of service (PDOS) via software attacks (permanent or quasi-permanent physical damage to platform and its components done remotely).

Security attackers can often identify security vulnerabilities by performing reverse-engineering of a CPU by mounting software or hardware attacks and then inferring the mindset of architects and designers to predict the types of mistakes in their thought process that may lead at any moment to the involuntary introduction of vulnerabilities during the product development. Thus, architecting and designing of security capabilities in CPUs or other processing devices or microprocessors may require architects and designers to have an attacker's mindset. An attacker's mindset is a unique way of thinking, anchored around a target (taking the complete control of a system, inflicting permanent denial of service, etc.) and moving through multiple sets of silicon behaviors (including vulnerabilities) and linking these behaviors into an attack that starts from an unprivileged environment and moves closer and closer to the target. Architects and designers without extensive experience in attacking systems will often lack a fundamental tool used by highly-skilled attackers and the products of their engineering work will suffer from critical security vulnerabilities that can be exploited by attackers.

As described above, a laser fault injection attack is a highly powerful physical attack against CPUs or other processing devices that are of extreme complexity (billions of transistors) and that are manufactured in smaller and smaller geometries (e.g., 14 nm, 10 nm, 7 nm, etc.). FIG. 2A is a flowchart of a method 200 for executing a fault injection attack on a processing device, such as CPU 101, in accordance with one illustrative example. The operations of the method 200 may be performed by an attacking entity on a CPU 101 to attempt to gain undetected control of the CPU, among other nefarious and damaging intents.

Figure 2B:
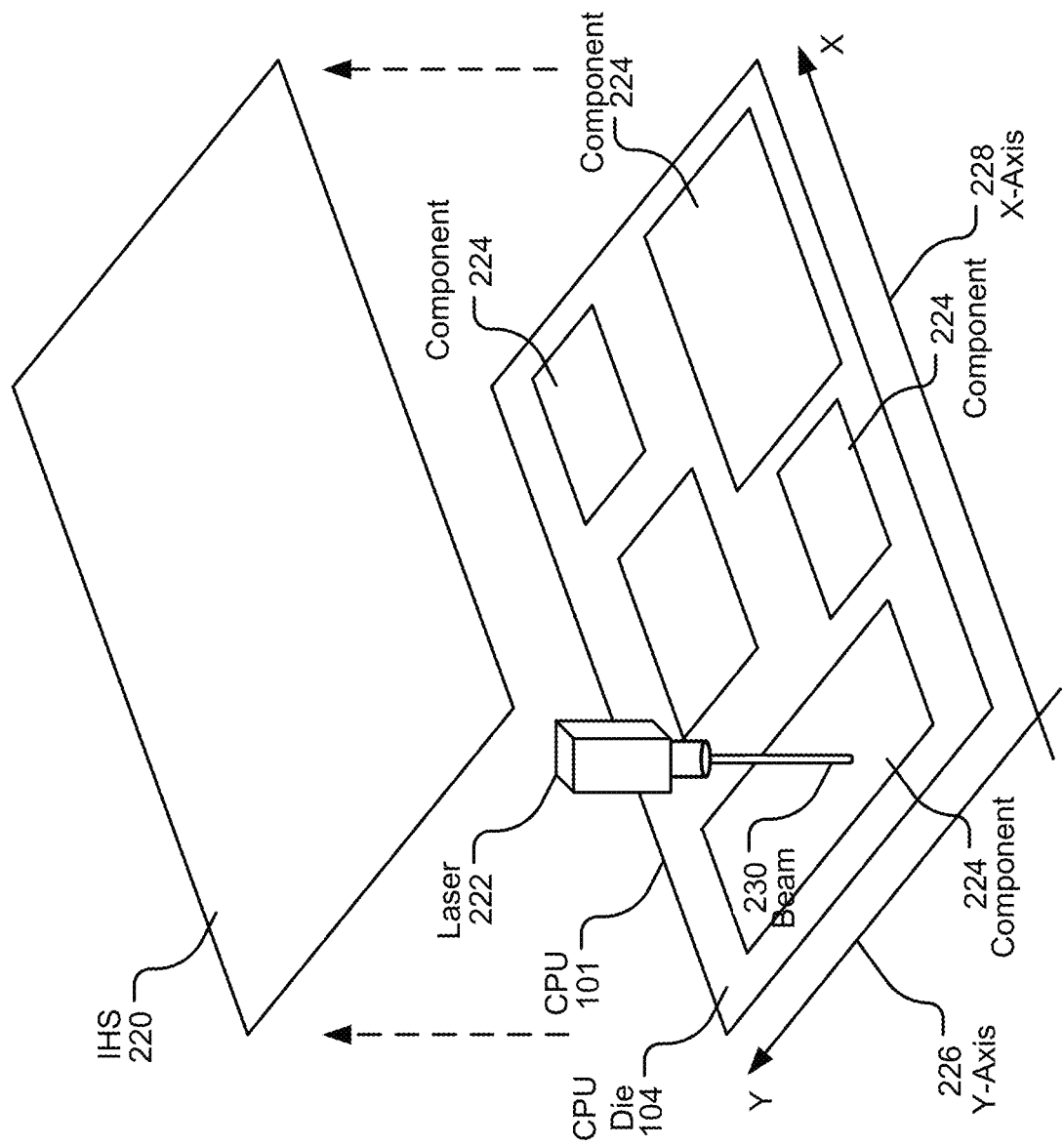
FIG. 2B is a schematic diagram illustrating using a laser for a fault injection attack on a processing device, in accordance with aspects of the disclosure.

Beginning at operation 202, an attacker may obtain the target CPU 101 (or other computing or processing-type device) and remove an integrated heat spreader (IHS) from the CPU package 102. FIG. 2B illustrates is a schematic diagram illustrating using a laser device 222 for a fault injection attack on a processing device, such as CPU 101 of FIG. 1. As shown and discussed above, the CPU 101 may include a CPU die 104 area on which one or more CPU components 224 may be mounted. As shown in FIG. 2B, an integrated heat spreader (IHS) 220 may be mounted on the CPU 101 over the components and, in some instances, may be glued or soldered into place on the CPU package 102. During a process known as "delidding", an attacker may remove the IHS 220 from the CPU package 102, as indicated by the dashed arrows of FIG. 2B. Removal of the IHS 220 provides visual and physical access to the topmost layer of the CPU die 104 underneath the IHS 220.

Figure 2C:
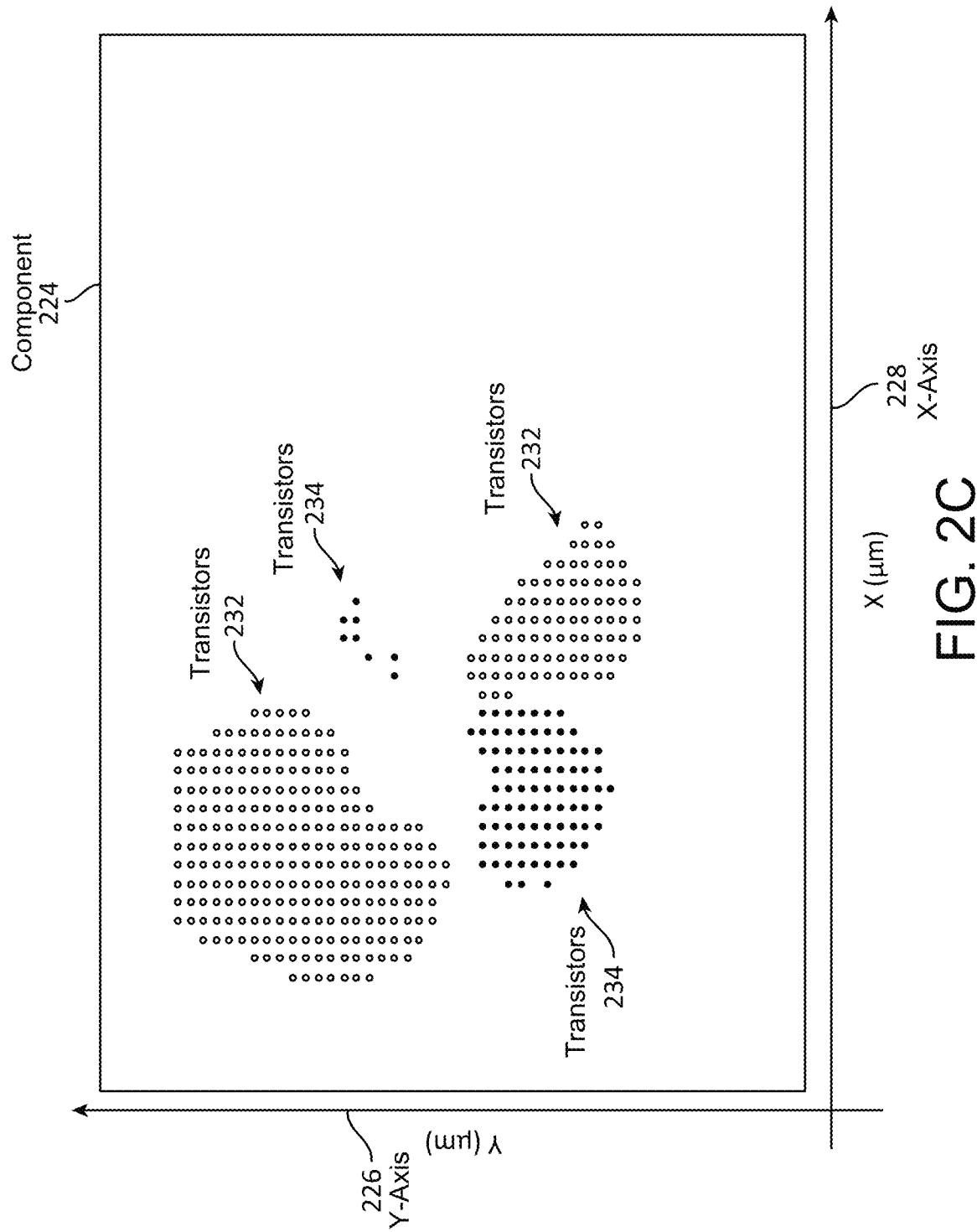
FIG. 2C is a schematic diagram illustrating an electromagnetic radiation map of a component of a processing device, in accordance with aspects of the disclosure.

At operation 204, the attacker may operate and monitor the CPU 101 as one or more programs are executed by the CPU. For example, the attacker may power up the CPU 101 while an air fan is used to cool the CPU to prevent the thermal sensors in the CPU and other components from tripping and shutting the CPU down. Once powered, the attacker may cause the CPU 101 to execute one or more programs and, at operation 206, use one or more electromagnetic radiation detectors to isolate and identify the active areas of the CPU triggered by a specific software sequence. As the executed program calls and utilizes the various components of the CPU 101 to execute the program, the one or more electromagnetic radiation detectors can provide the attacker an indication of components of the CPU 101 are activated by the executed program. For example, FIG. 2C is a schematic diagram illustrating an electromagnetic radiation map of a component of a processing device, in accordance with some examples. Component 224 may be one of the components on the die 104 of the CPU 101 illustrated in FIG. 2B. During execution of a program, the component 224 may be monitored with one or more electromagnetic radiation detectors to detect one or more transistors that may be activated by the execution of the program. FIG. 2C illustrates the detected activated transistors 232, 234 by the executed program. In some examples, the electromagnetic radiation detectors may determine if a group of transistors in a given die area are switching. In addition, an attacker or attacking device may correlate the activated components (e.g., transistors 232 and transistors 234) to a coordinate system. In one example, the surface area of the die 104 may be mapped to a coordinate system including x-values 228 and y-values 226, although other coordinate systems may be used. Through the mapping, coordinates of one or more of the activated transistors of the CPU 101 may be determined and utilized to control the laser device 222 to target specific transistors of the CPU for attack.

At operation 208, the attacker may program the fault injection laser device 222 with various parameters (e.g., frequency, power, pulse time, 2D position, etc.) and mount an attack on the exposed die 104 of the CPU 101. As explained above, the laser may affect the CPU device layer through the photoelectric effect resulting in (multiple) transistor(s) (or other component) behavior changes (e.g., SRAM cell bit being cleared to 0 or set to 1). More particularly, the laser beam 230 may cause a transient current (through the emission of electrons within one or more of the transistors of the CPU 101) that changes a stored value of the affected transistor from a 0 to a 1 or a 1 to a 0 value. In some instances, the various parameters of the laser beam 230 may be more or less effective in generating the transient current in the affected transistors. For example, a short pulse time of the laser beam 230 may not generate enough of a transient current to flip a transistor value. In another example, the frequency of the laser beam 230 may need to be within a particular range of frequencies to be effective in generating the transient current necessary to change the value of the transistor. At operation 210, the attacker may test the success of the attack using software techniques that probe the change in CPU behavior following the laser fault injection attack. Depending on the results of such a test, the attacker may iterate the above process to refine the attack through multiple laser parameters until the desired silicon behavior is achieved. For example, the attack on a particular transistor or group of transistors may fail to provide a desired level of access to the operations of the CPU 101 such that control over the CPU has not been gained by the attack. The attacker may then reset the laser device 222 to attack a different transistor or set of transistors (or set the laser device with a different frequency, power, pulse time, etc.) and mount another attack. Through this trial-and-error process, the parameters for controlling the laser device 222 for a successful fault injection attack may be determined by the attacker. The parameters of the successful attack may be saved by a computing device such that subsequent fault injection attacks on the CPU 101 (or any CPU of the same design) may be automated by the computing device to control the laser device 222 with the known successful parameters. This is a Break Once Run Everywhere (BORE) type-attack that applies the same parameters against any other device with the same design, therefore being a highly-scalable attack (e.g., a certain laser fault injection attack against a given CPU will work against any other CPU of the same design).

The attack methodology described above can result in the attackers completely compromising the physical security of the CPU 101. Such attacks may also result in the installation of persistent and undetectable rootkits in a very short period of time.

Figure 2D:
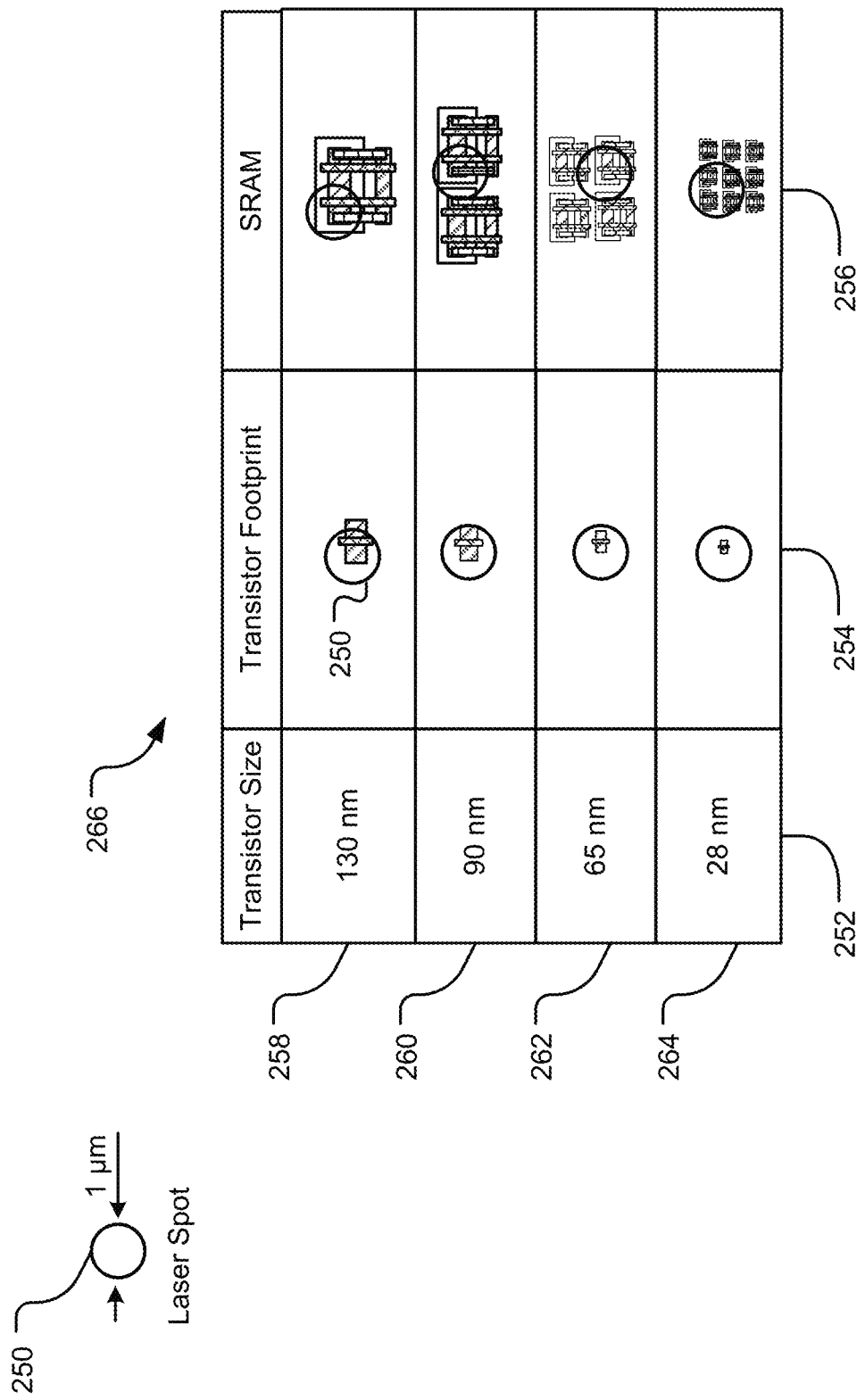
FIG. 2D is a schematic diagram illustrating various transistor sizes of a processing device in relation to a laser spot used in a laser fault injection attack, in accordance with aspects of the disclosure.

As noted above, the diameter of the laser beam 230 used in the fault injection attack may be much larger than the relatively small size of the one or more transistors and/or components of the CPU 101. In particular, FIG. 2D is a schematic diagram illustrating various transistor sizes of a processing device in relation to a laser spot used in a laser fault injection attack, in accordance with some examples. As shown in FIG. 2D, a typical laser spot 250 may have a diameter of around 1 μm. However, transistor sizes (as illustrated in column 252) included in a CPU 101 may vary but are often smaller in size than the laser spot 250. Table 266 illustrates four transistor sizes (130 nm, 90 nm, 65 nm, and 28 nm), a corresponding transistor footprint (as illustrated in column 254 for each transistor size), and a corresponding SRAM memory cell comprising transistors of that size (column 256). Each of row 258, row 260, row 262, and row 264 of the table 266 illustrates the laser spot 250 illuminated on the transistor footprint of the corresponding size and on an SRAM memory cell comprising transistors of the corresponding size. For transistors sizes of 130 nm and 90 nm, the 1 μm may be small enough that only the target transistor or SRAM memory cell is affected such that the attack may accurately target one transistor. However, for transistors of smaller size (such as transistor sizes of 65 nm and 28 nm as shown in rows 262 and 264), the laser spot 250 is too large compared to the size of the target transistor. As shown in column 256 for those transistor sizes, more than one memory cell is hit by the laser spot 250 such that multiple cells and/or transistors may have their values altered from the fault injection attack.

As noted above, systems and techniques described herein provide mitigation against laser fault injection attacks on components of a CPU (e.g., CPU 101) or other processing device. In some cases, the critical components of the CPU or other processing device affected by a laser fault injection attack can be classified into storage blocks or components that store security-sensitive data, such as firmware (e.g., CPU firmware), configuration information, key material, any combination thereof, and/or other security operation-related data (e.g., authentication results, debug levels, etc.) and security-sensitive logic gates or blocks that control the operation of security blocks of the CPU or other processing device that can perform security features of the CPU or other processing device. In general, a security block is a logic/storage block inside a processing device that performs a security operation such as random number generation, symmetric or asymmetric key generation or derivation, symmetric encryption and decryption (e.g., using an encryption algorithm), digital signature generation (e.g., RSA or ECDSA signing using a private key and/or other type of digital signature generation), digital signature verification (e.g., RSA or ECDSA signature verification using a public key and/or other type of digital signature verification), secure hashing (e.g., using SHA1, SHA2, SHA3, and/or other type of algorithm), and the like. Examples of logic gates or blocks include logic block 106, random number generator 110, and encryption block 112 of CPU 101 discussed above. An example of a storage block or components is memory device(s) 108 discussed above. In general, logic blocks operate within the period of a given internal CPU clock and storage blocks store the data for at least one given internal CPU clock. However, it should be appreciated that any component of the CPU 101 may operate on any number of clock cycles and may be classified as storage blocks, logic blocks, or any other type of CPU component.

Turning first to storage components of the CPU 101, on-die memory components, such as memory device(s) 108, can be protected against laser fault injection attacks via multiple mechanisms and/or techniques. Such techniques may depend upon the type of data being stored in the memory device(s) 108, such as static data, dynamic data, performance-critical data, nonperformance-critical data, and the like, as explained in more detail below.

Figure 3:
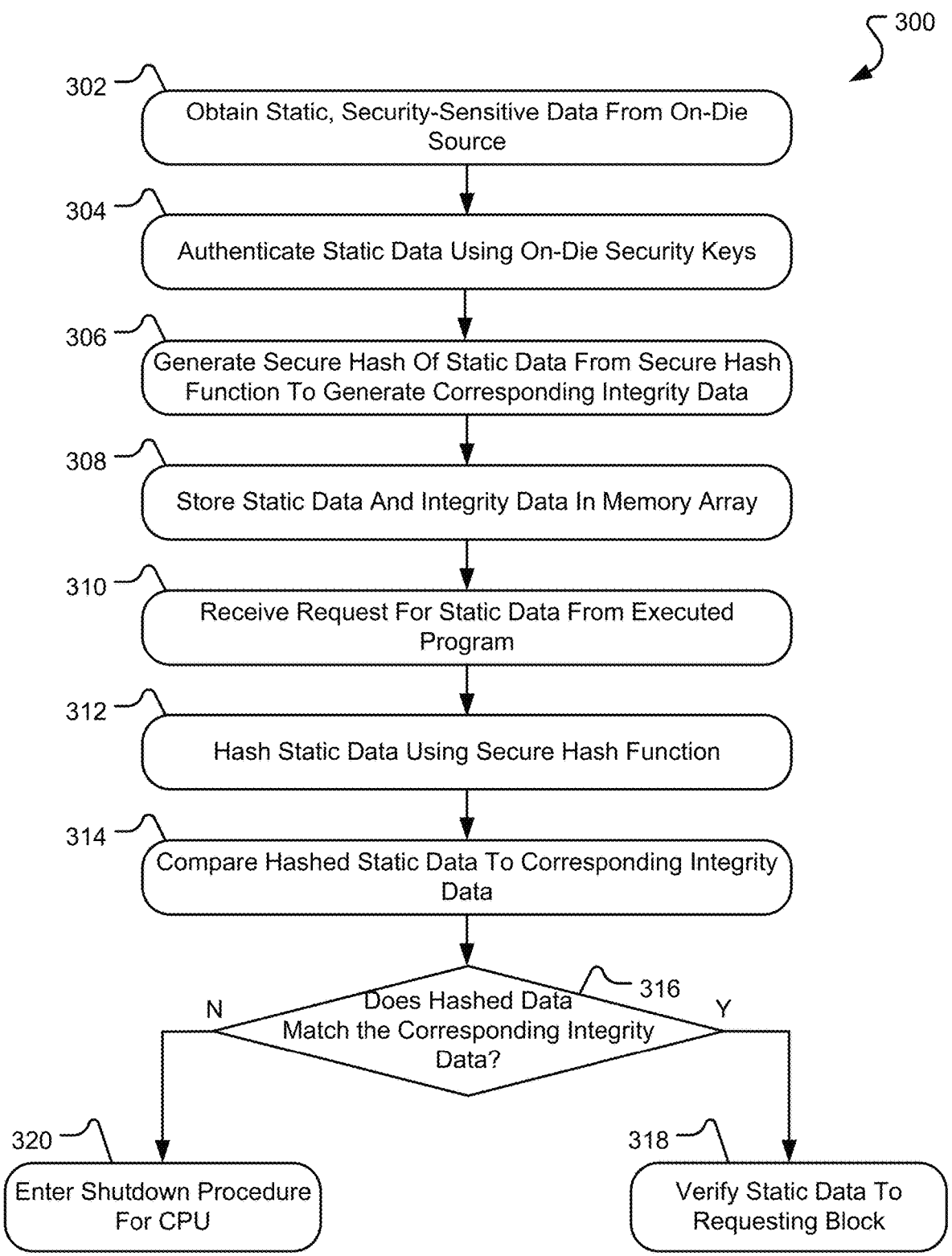
FIG. 3 is a flowchart illustrating an example of a method (or process) for mitigating a fault injection attack on security-sensitive, non-performance critical data of a processing device, in accordance with aspects of the disclosure.

FIG. 3 is a flowchart of a method 300 for mitigating a fault injection attack on security-sensitive, non-performance critical data of the CPU 101 in accordance with one illustrative example. The operations of the method 300 may be performed or executed by the CPU 101, such as through execution of a firmware program, one or more logic gates or other hardware configurations, or a combination of both a firmware program and hardware devices. In one particular example, the CPU 101 may include one or more security blocks located on the CPU die 104 and configured to execute security features of the CPU 101. Regardless of the component or components of the CPU executing or performing the method 300, the operations may provide a mitigation against a laser fault injection attack on the CPU 101 for security-sensitive data of the CPU that is not performance-critical. Nonperformance-critical data may be data of the CPU 101 that may be processed without impacting one or more performance criteria of the CPU, such as a set processing speed ceiling for the CPU. In general, nonperformance-critical data may take several clock cycles to be stored or retrieved, while performance-critical data may be processed through one or a few clock cycles. As such, in some cases, the processing speed of the security-sensitive data may determine if the data is performance-critical or nonperformance-critical.

In addition to performance-critical or nonperformance-critical, the data of the CPU 101 may also be classified as static or dynamic. Static data is data that does not change over the operating lifecycle of the CPU 101 or until a reset of the CPU. Dynamic data, on the other hand, is data that changes during the operation of the CPU. Examples of static security-sensitive data that is not performance critical may include, but is not limited to, CPU firmware and configuration information stored in on-die non-volatile memory, such as physical CPU fuses, phase change memory, etc. Examples of dynamic security-sensitive data that is not performance critical may include, but is not limited to, CPU debug level setting information based on a given local or remote debug authentication mechanism.

For static security-sensitive, nonperformance critical data, an on-die security block or other functional block of the CPU 101 may, at operation 302, obtain the static data from an on-die source (such as the CPU fuses, phase change memory, etc. mentioned above). At operation 304, a security block of the CPU 101 may authenticate the static data using one or more authentication and encryption keys and corresponding authentication and encryption techniques. For example, the encryption block 112 may generate one or more encryption keys for encrypting data stored in volatile memory 108. In one illustrative example, the security block can generate one or more encryption keys based on a random number generated by and received from the random number generator 110. For instance, a digital random number generator (DRNG), such as random number generator 110 of FIG. 1, may generate random numbers based on noise detected by special logic structures within the random number generator component and associated physical design. One example of such a logic structure is a highly unstable static random-access memory (SRAM) cells. These generated random numbers can be provided to and used by other security blocks (such as encryption block 112) directly as symmetric keys (e.g., for an encryption/decryption algorithm), input in a symmetric key derivation algorithm (e.g., the random number can be concatenated with a static die key stored in CPU fuses and hashed to generate a derived symmetric key), as a seed for generating a public/private key pair used by asymmetric cryptographic algorithms (e.g., the random number will be used to find the nearest prime number to be used for the public/private key generation), etc.

Once the authentication key is generated, authentication of the static data may be performed by the security block of the CPU 101 through known authentication techniques, such as through a digital signature verification utilizing an encryption key generated through a Rivest-Shamir-Adleman (RSA) encryption technique or an Elliptic Curve Digital Signature Algorithm (ECDSA) encryption technique. However, other authentication techniques may also be utilized by the security block of the CPU 101. In one illustrative example, the encryption block 112 may generate a private/public key pair. The generated private key may be used, such as by the encryption block 112, to encrypt and generate a signature for a data blob that represents the input data (the data blob may, in some examples, include a secure hash of the input data and other metadata, such as the size of the input data and/or some other fixed data items. The input data along with the public key and digital signature is stored inside the CPU die or outside the CPU die. In some instances, the input data may be encrypted using a symmetric key. To authenticate the static data retrieved from the CPU die or outside the CPU die, CPU may store the public key or the hash of the public key on the CPU die. Upon retrieval of the public key, the CPU determines if the stored public key matches the one retrieved. If the keys match, then the CPU may perform the digital signature verification (signature decryption) using the public key. The CPU may then hash the input data and compare the computed hash with the one from the decrypted signature. Comparison of the metadata with the expected values (e.g., input data size, padding, etc.) may also be performed and the static data is authenticated if all the checks pass.

At operation 306, the same security block of the CPU 101 (that authenticated the static data) or another security block may generate an authenticated secure hash of at least a subset of the static data. For example, the security block can generate authenticated secure hash of at least a subset of the static data at least in part by utilizing a secure hash function to generate corresponding integrity data associated with the static data. The secure hash function may be any known or hereafter developed hashing function, such as Secure Hashing Algorithm 3 (SHA-3), Advanced Encryption Standard with Galois/Counter Mode (AES-GCM) hashing function, and the like. Through the hashing function, all or some of the static data may be hashed into a block of data, referred to herein as "integrity data". The integrity data may be used to verify that the stored static data has not been altered or manipulated, as explained in more detail below.

At operation 308, the static security-sensitive data and the corresponding integrity data may be stored in a memory array, such as in memory device(s) 108. The memory array may include a block of memory that includes at least a portion of the static data and the corresponding integrity data. In some instances, the integrity data may be interleaved with the static security-sensitive data in the memory array. In other instances, the integrity data may be stored in the memory device(s) 108 in a physical location next to a physical location for storing at least a portion of the static security-sensitive data. For example, the integrity data may be stored at a first memory address within the memory device(s) 108 and at least the portion of the static security-sensitive data may be stored at a second memory address within the memory component, where the first memory address is physically immediately next to the second memory address within the memory component. Regardless, the static security-sensitive data and the corresponding integrity data may be stored in near proximity within the memory device(s) 108 of the CPU 101. As explained above, because laser fault injection attacks affect multiple transistors in the same die area of a CPU (e.g., based on the large size of the laser beam relative to the size of the transistors), an attack targeting the static security-sensitive data would also affect the corresponding integrity data stored with the static data. For example, assuming a 14 nm manufacturing process with a static random access memory (SRAM) cell size of 0.058 $\mu m^2$, up to 17 SRAM cells may be affected in varying ways by a laser fault injection attack with a laser spot size of 1 $\mu m$. As described below, laser fault injection attacks against on-die volatile memory may be detected and mitigated by restarting the CPU, shutting down the CPU, entering a safe mode in which all data consumption is halted, and the like, which can eliminate an attacker's ability to control flipping of individual non-volatile memory storage elements (e.g., SRAM cell bits).

At operation 310, the CPU 101 may receive a request for the static security-sensitive data stored in memory device(s) 108 from a program executed by the CPU. Several programs and/or blocks of the CPU 101 may request and be provided access to the static security-sensitive data, including blocks on-die (on the CPU die 104) and/or blocks or components connected to the CPU through one or more interfaces. Regardless of whether the request for the data is received locally (e.g., from on-die blocks) or remotely (e.g., via one or more input-output ports), the program and/or the CPU 101 may be unaware of a laser fault injection attack that may have occurred while the static security-sensitive data was stored in the memory device(s) 108. Thus, at operation 312, the security block may retrieve the requested static data from the memory device(s) 108 and perform a secure hash of the static data. The security block may utilize the same secure hashing function as used above to generate the corresponding integrity data.

At operation 314, the security block may compare the hash of the retrieved static security-sensitive data to the corresponding integrity data (which, as noted above, is a hashed version of all or some of the static data that is included in a block of data) calculated above and stored along with the static security-sensitive data. In alternate examples, both the security-sensitive data and the integrity data may be sent to the consuming block of the CPU 101 or the remote consuming block for hashing of the security-sensitive data and comparison to the integrity data. Regardless of which device or component receives the static security-sensitive data and the corresponding integrity data, a comparison may be performed to determine if a hash of the security-sensitive data and the integrity data match, as at operation 316. If the hash of the stored security-sensitive data matches the corresponding integrity data, the static security-sensitive data is verified and the consuming block may process the received static security-sensitive data at operation 318. If the hash of the stored security-sensitive data does not match the corresponding integrity data, however, the static security-sensitive data may have suffered a fault injection attack and the CPU 101 may enter a shutdown procedure in response to the potentially detected fault injection attack at operation 320. In one illustrative example, the shutdown procedure may include a secure reboot of the CPU 101 to ensure that a new and accurate digital copy of the static security-sensitive data may be stored in memory device(s) 108 through the operations described above. In general, any number of procedures may be executed following the detection of a potential fault injection attack, including complete shutdown of the CPU 101 device.

As noted above, laser fault injection attacks affect multiple transistors in the same die area of a CPU such that an attack targeting an area of a memory component (such as memory cells storing static security-sensitive data) would also affect the memory cells around the target area due to the relatively large size of the laser scope in comparison to the size of CPU 101 components or devices. By storing static security-sensitive data in the same array or in the same vicinity on the CPU die 104 with the corresponding integrity data, both sets of data will be affected by a laser fault injection attack. The security-sensitive data integrity computation and comparison with the expected integrity value described above in method 300 therefore successfully mitigates laser fault injection attacks against on-die volatile memory due to the attacker's inability to fully control flipping of individual non-volatile memory storage elements (e.g., SRAM cell bits). The CPU 101 may thus be prevented from processing data manipulated by a laser fault injection attack.

A similar method may be executed for dynamic security-sensitive, nonperformance critical data. An example of such data includes a CPU debug level setting based on a given local or remote debug authentication mechanism, although any security-sensitive, nonperformance critical CPU data may be considered dynamic. Regardless, the CPU 101 and/or other components associated with CPU may perform one or more of the operations of the method 300 of FIG. 3. Through the method 300, the dynamic security-sensitive data that is not performance critical will be paired with its corresponding integrity value computed by the same on-die security block that outputs this dynamic security-sensitive data using any secure hashing algorithm (e.g., SHA-3, AES-GCM, etc.). The dynamic security-sensitive data and the corresponding integrity data may be stored together in a given volatile memory structure, such as a memory array or in a similar location within a memory component (e.g., within memory device(s) 108). When any piece of this security-sensitive data is used by any processing block, either locally or remotely within the die, the consuming block will perform an integrity computation on the dynamic security-sensitive data and compare it with the original integrity data. The dynamic security-sensitive data and its corresponding integrity data may both be sent to the remote CPU block via whatever on-die interface is used to connect the CPU block and the volatile memory. Again, the dynamic security-sensitive data integrity computation and comparison with the expected integrity value successfully mitigates laser fault attacks against on-die volatile memory due to the attacker's inability to control flipping of individual non-volatile memory storage elements (e.g., SRAM cell bits).

Figure 4:
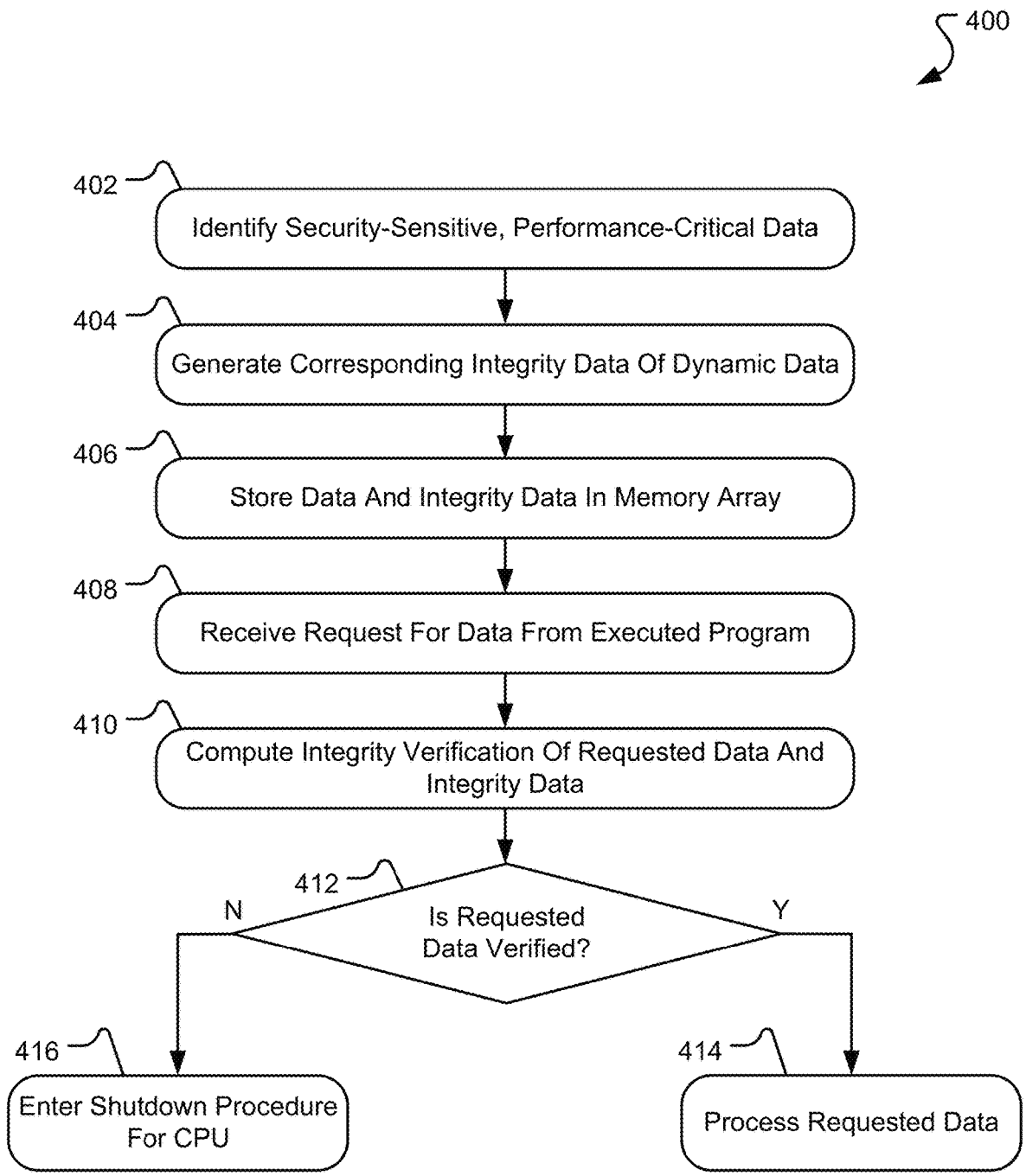
FIG. 4 is a flowchart illustrating an example of a method (or process) for mitigating a fault injection attack on security-sensitive, performance critical data of a processing device, in accordance with aspects of the disclosure.

In addition to nonperformance critical data, a fault injection attack against performance critical data may also be mitigated. Performance critical data of the CPU 101 is data that is processed quickly to ensure the CPU meets certain performance standards, such as processing speed. Such data is always dynamic and, in most cases, is processed on each clock cycle of the CPU 101. One example of performance critical data is CPU physical register file data. Register file data is stored on or retrieved from the register file on a single clock cycle to execute processes of the CPU 101. However, due to the fast-processed nature of performance critical data, generation and storage of hashed integrity data may not be feasible while maintaining the operation of the CPU 101 within performance tolerances. To provide integrity data for comparison as above, performance critical data may include a more lightweight or faster integrity technique. More particularly, FIG. 4 is a flowchart of a method 400 for mitigating a fault injection attack on security-sensitive, performance critical data of a processing device in accordance with one illustrative example. As above, the operations of the method 400 may be performed by or executed by the CPU 101, such as through execution of a firmware program, one or more logic gates or other hardware configurations, or a combination of both a firmware program and hardware devices. In one particular example, the CPU 101 may include one or more security blocks located on the CPU die 104 and configured to execute security features of the CPU 101. Regardless of the component or components of the CPU executing or performing the method 400, the operations may provide a mitigation against a laser fault injection attack on the CPU 101 for security-sensitive, performance critical data.

Beginning at operation 402, the CPU 101 may identify security-sensitive, performance critical data of the CPU or components of the CPU. Such data may be data associated with the security of the CPU 101 but is processed so as to maintain the operation of the CPU within a performance tolerance, such as a processing speed of the CPU. For each portion of the identified security-sensitive, performance critical data, the CPU 101 may, at operation 404, generate corresponding integrity data based on the identified security-sensitive, performance critical data. In one illustrative example, the generation of the integrity data may include calculating Error Correction Code (ECC) bits or parity bits for the security-sensitive, performance critical data, although other integrity data generating techniques that do not require many clock cycles to complete may also be used. The generation of the corresponding integrity data for the security-sensitive, performance critical data may be executed for the smallest data block size that is acceptable for a given performance level of the CPU 101. In other words, the data block size of the identified security-sensitive, performance critical data for calculating the integrity data (ECC or parity) may be based on one or more performance tolerance parameters to ensure that performance measurements of the CPU do not exceed the tolerance values when generating the integrity data. Generation of the integrity data for the security-sensitive, performance critical data may be performed from any known or hereafter developed parity or integrity data generating technique.

Following the generation of the integrity data, the security-sensitive, performance critical data and the corresponding integrity data may be stored together in a memory array at operation 406 and as described above. In one illustrative example, the integrity data may be appended to the security-sensitive, performance critical data block such that the security-sensitive, performance critical data and the integrity data is stored as a data block in memory device(s) 108. In another illustrative example, the integrity data may be stored separate from the security-sensitive, performance critical data in a similar physical location on the CPU die 104 within memory device(s) 108. As explained above, because laser fault injection attacks affect multiple transistors in the same die area of a CPU, an attack targeting the security-sensitive, performance critical data would also affect the corresponding integrity data stored with the performance critical data so that a fault injection attack may be detected and mitigated by the CPU 101.

More particularly, the CPU 101 may receive a request for the security-sensitive, performance critical data stored in memory device(s) 108 from a program executed by the CPU at operation 408. Several programs and/or blocks of the CPU 101 may request and be provided access to the security-sensitive, performance critical data, including blocks both on-die (on the CPU die 104) and/or blocks or components connected to the CPU through various input/output ports to the CPU. At operation 410, the CPU 101 may retrieve the requested security-sensitive, performance critical data from the memory device(s) 108 and perform an integrity check on the security-sensitive, performance critical data. In particular, the CPU 101 (or requesting processing block) may compute the integrity data from the requested security-sensitive, performance critical data, such as through an ECC or parity generating technique. At operation 412, the CPU 101 may determine if the computed integrity data of the retrieved security-sensitive, performance critical data matches the corresponding stored integrity data calculated above to verify the performance critical data has not been altered from a laser fault injection attack. If the computed integrity data of the performance critical data matches the corresponding retrieved integrity data, the data is verified and the consuming block may process the obtained security-sensitive, performance critical data at operation 414. If the calculated integrity performance critical data does not match the corresponding integrity data, the security-sensitive, performance critical data may have suffered a fault injection attack and the CPU 101 may enter a shutdown procedure in response to the potentially detected fault injection attack at operation 416.

The combination of the security-sensitive data lightweight integrity computation and comparison with the expected integrity value, on one hand, and the extremely high frequency (e.g., multi-gigahertz) of a given CPU clock, on the other hand, successfully mitigates laser fault injection attacks against on-die memory (e.g., memory device(s) 108) due to the attacker's inability to control both the flipping of individual non-volatile memory storage elements (e.g., SRAM cell bits) and properly aligning the laser fault injection attack with the exact time the CPU block is operating on the security-sensitive data (the CPU block alternates operation on normal data with operation on security-sensitive data).

Figure 5:
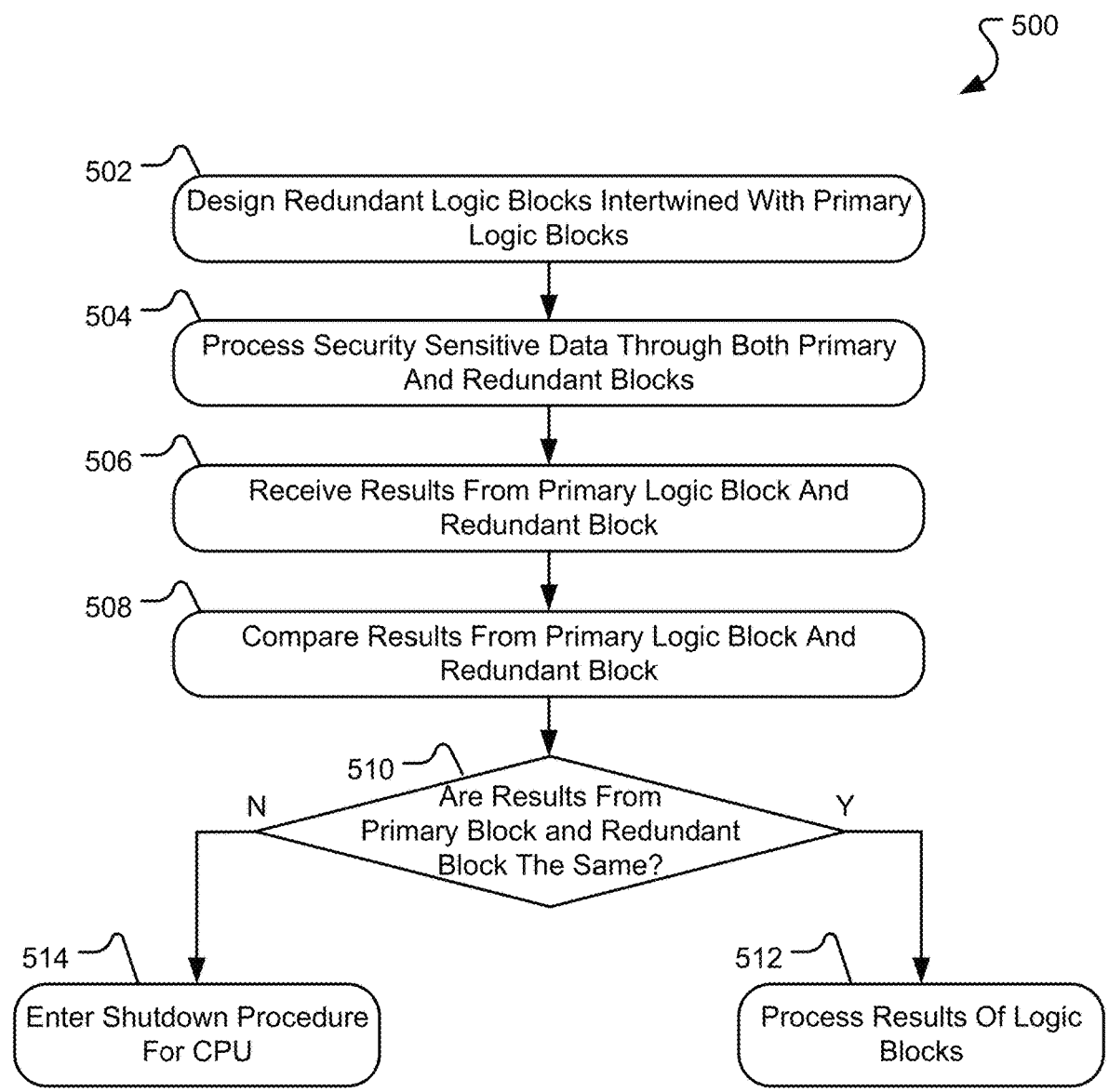
FIG. 5 is a flowchart illustrating an example of a method (or process) for protection of logic gates of a processing device against a fault injection attack, in accordance with aspects of the disclosure.

In addition to memory components (such as memory device(s) 108 of CPU 101), security-sensitive logic gates (logic) may also be effectively protected against laser fault injection attacks via redundancy-based protection mechanisms. For example, logic block 106, random number generator 110, and/or encryption block 112 of CPU 101 may also include mechanisms and/or procedures for mitigating against laser fault injection attacks. FIG. 5 is a flowchart of a method 500 for protection of logic gates of the processing device, like CPU 101, against a fault injection attack in accordance with one illustrative example. One or more of the operations of the method 500 may be performed by the CPU 101, such as a security block of the CPU, although any other computing device of the CPU or in communication with the CPU may execute the operations.

Figure 6:
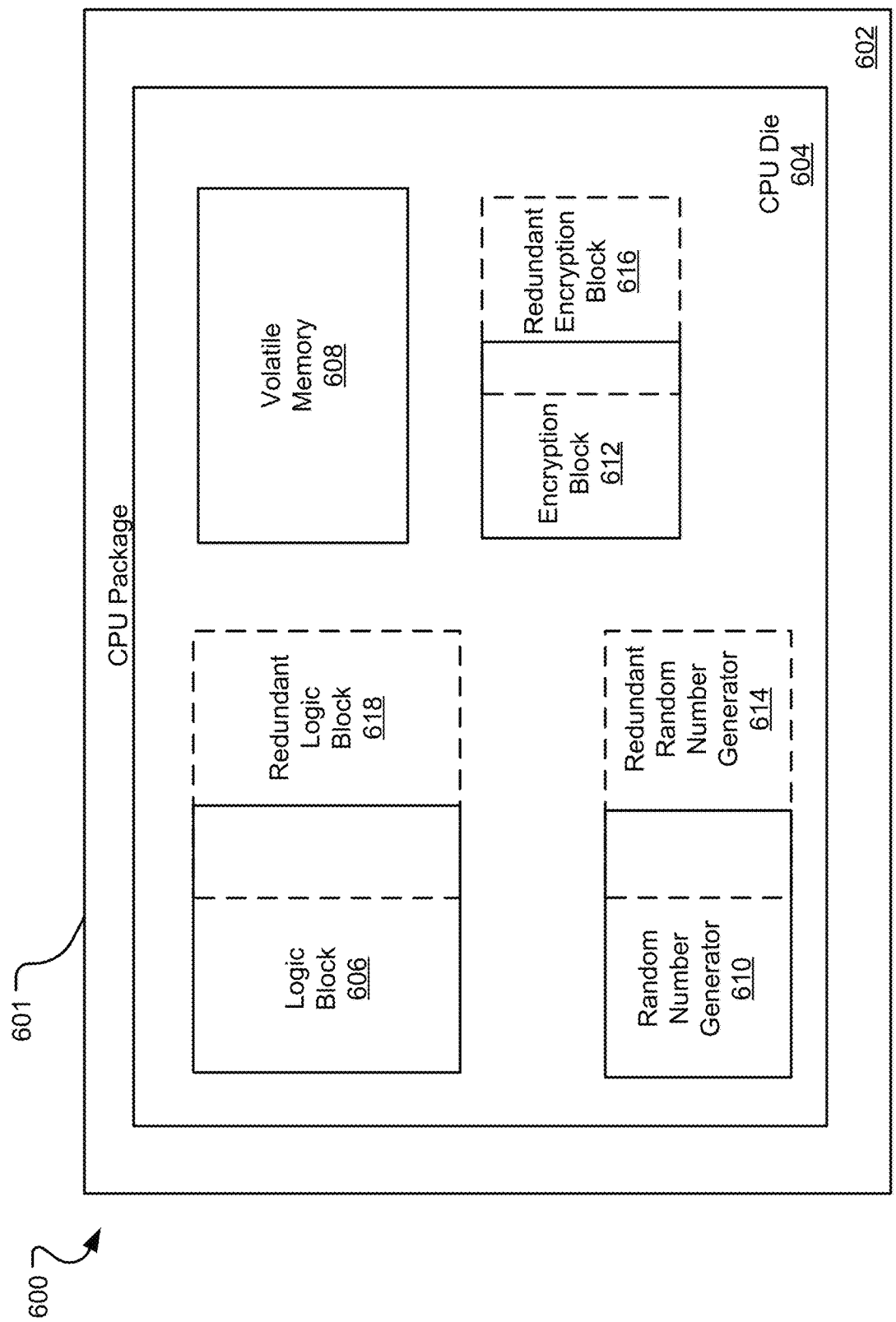
FIG. 6 is a schematic diagram illustrating an example of a computing environment for protection of logic gates of the processing device against a fault injection attack, in accordance with aspects of the disclosure.

Beginning at operation 502, the CPU 101 may be designed such that multiple logic gates of security-sensitive CPU blocks may have built-in redundancy logic gates in the same CPU die 104 area. For example, FIG. 6 is a schematic diagram 600 illustrating an example of a computing environment, such as CPU 601, for protection of logic gates of the CPU against a fault injection attack in accordance with one illustrative example. The CPU 601 of FIG. 6 is similar to that described above and may include the same, more, or fewer components, including a logic block 606, volatile memory 608, a random number generator 610, and/or an encryption block 612 on a CPU die 604 mounted on a CPU package 602. In addition to the noted components, the CPU 101 may also include one more redundant logic blocks (e.g., redundant encryption block 616 and redundant logic block 618) that include duplicate logic gates from one or more other blocks (e.g., logic block 606, random number generator 610, and encryption block 612) of the CPU. For example, a redundant logic block 618 may be included on the die 604 of the CPU 601. Other redundant logic blocks, such as redundant encryption block 616, may also be included in the CPU 101.

In general, each redundant logic block 614-618 may include one or more of the same type of logic gates of a corresponding logic block 606-612 interconnected in the same or similar manner as the logic block. In this manner, the redundant logic blocks 614-618 may process data similar to the corresponding logic block 606-612. In addition, the gates and/or conductors of the redundant logic blocks 614-

618 may be located on the CPU die 604 intertwined with or physically near the logic gates of the corresponding logic blocks 606-612 such that a laser fault injection attack affects gates of both the logic block and the corresponding redundant logic block. The intertwining location of the redundant logic blocks 614-618 is illustrated as the overlapping boxes of the logic block and redundant logic blocks in FIG. 6. In other examples, the redundant logic block may be located on the CPU die 604 next to or in the near vicinity of the corresponding logic block. The redundant logic blocks 614-618 may include all or some of the same logic gates of the corresponding logic block. In other illustrative examples, the CPU 601 may include more than one redundant logic block for a corresponding logic block.

In some cases, in order to mitigate against laser fault injection attacks against the random number generator 614, the random number generator 614 logic design can be changed to make sure that two consecutive outputs of the random number generator 614 are not identical, as a laser fault injection attack may put the random number generator 614 state machine into a stuck state that causes the random number generator 614 random number output to be stuck to the last output value until the CPU is RESET).

Returning to FIG. 5, a program executed by the CPU 601 may provide security-sensitive input data for processing by a logic block of the CPU at operation 504. For example, the CPU 601 may provide an input string of bits to logic block 606 for processing in some manner. The security-sensitive input data may also be provided to the corresponding redundant logic block 618. Both the logic block and the corresponding redundant logic block may process the input string based on the logic gates and interconnections of the respective blocks. The processing of the security-sensitive data may be done in parallel through the logic block and corresponding redundant logic blocks. At operation 506, the CPU 601 may receive the results from the logic block and the corresponding redundant logic block.

At operation 508, the CPU 601 or one or more blocks of the CPU may compare the results from the logic block and the corresponding redundant logic block and, at operation 510, determine if the results from the logic block and the corresponding redundant logic block are the same. As noted above, a fault injection attack on a logic block would also affect the redundant logic block in an unpredictable manner such that an attack corrupts one or more of the parallel computations. The results of the logic blocks may then be compared with the results of the redundant logic blocks to determine the integrity of the computation. In other words, the computation on security-sensitive data may be done in parallel with one or more computations on data sets with logic gates belonging to the multiple functional blocks in the same die area affected by a laser fault injection attack (again so the attack will corrupt one or more computations) and the results of the all functional blocks operating on data sets are compared with the expected outputs to determine the integrity of all computations (including the computation on security-sensitive data via the die proximity to the laser fault injection attack). If the results match, the CPU 601 may determine that the logic blocks have not been attacked and the consuming block may process the logic block results at operation 512. On the other hand, if the results do not match, the CPU 601 may determine that the logic blocks have been fault injection attacked and the consuming block may enter a shutdown procedure or undergo some other mitigation technique to prevent consumption of the attacked data at operation 514.

In one particular example, the encryption block 612 can be successfully protected against laser fault injection attacks through designing of the CPU 601 to incorporate a redundant functional block (e.g., redundant encryption block 616) such that logic gates belonging to both blocks are affected by a laser fault injection attack for the entire die area occupied by both blocks and comparing the outputs of the two redundant logic blocks. Alternatively, the CPU 601 may include a functional block that performs a computation on static data such that logic gates belonging to both blocks are affected by a laser fault injection attack for the entire die area occupied by both blocks and comparison the output of the added functional block with the expected static output may provide an indication of a fault injection attack.

In another example, a random number generator 610 can be successfully protected against laser fault injection attacks by incorporating a redundant logic block (e.g., redundant encryption block 616) that compares the successive outputs of the random number generator and detects collisions caused by laser fault injection attacks that cause the random number generator state machine to get stuck and generate the same random number, thus breaking the entropy required by cryptographic algorithms.

In other examples, as noted above, multiple redundant logic blocks corresponding to the logic block may be instantiated on the CPU die 604. Each of the multiple redundant logic blocks may operate either in lockstep or with fixed or random delays with respect to a logic block when processing the data. The multiple redundant logic blocks may overlap with the logic block as explained above or may be located separate from the logic block. To aid in mitigating against the fault injection attack, the outputs of the multiple redundant blocks may be compared as above to determine if any of the outputs vary in comparison with any other of the outputs. As it difficult for an attacker to mount multiple synchronous or asynchronous laser fault injection attacks on the die to replicate the same effect on each of the multiple redundant logic blocks and the logic block, a comparison of the outputs of each block may indicate that a fault injection attack has occurred.

Some laser fault injection attacks do not attempt to just alter a bit value of a component of the CPU 101, but rather intend to cause permanent physical damage to a given set of transistors on the CPU die 104. For example, the attacker may use the traditional laser fault injection attack procedure described above to affect a storage device (e.g., SRAM cell) to cause the storage device to unlock all the debug pieces of functionality, as if the device was unlocked following a local/remote authentication process. The attacker may then alter the laser fault injection attack parameters (e.g., power, pulse length) to inflict permanent damage to the given set of transistors and make the attack permanent. In such cases, the CPU 101 may be configured to mitigate against such attacked by using the data integrity generation and computation techniques described above to detect stuck transistors. Another mitigation technique may include changing the components of the CPU 101 utilizing the security-sensitive data to perform storage medium checks. Storage medium checks may include a process of storing a first known string of bits, such as a series of 0 values, with a component of the CPU 101 followed by storing a second known string of bits to the same locations or memory cells of the component, such as a series of 1 values. Through retrieval and analysis of the second known string of bits, the CPU 101 may determine of all of the corresponding transistors or cells of the component can flip from the 0 value to the 1 value. A similar procedure may be executed to determine if the transistors can flip from a 1 value to a 0 value. If a transistor tested through the storage medium check cannot flip its stored value, the transistor may be permanently damaged from a fault injection attack and one or more mitigation techniques may be executed to disregard the values of the damaged transistor. These checks can be performed repeatedly at fixed or random intervals to detect stuck transistors of components of the CPU 101.

Another type of fault injection attack may be based on using a fixed data value of multiple bits (for example, using an equal number of zeroes and ones) associated with a given security block state. For example, a CPU core may receive a debug unlock indication from a central debug control block connected to the joint test action group (JTAG) interface. The JTAG interface provides for debugging and on-chip verification and testing for circuits boards. A single wire may be connected to a single SRAM cell to indicate the debug unlock status for a given CPU core. As a debug unlock status may provide global control over a CPU, the single SRAM cell indicating the debug unlock status provides a particular vulnerability to the CPU. For example, a laser fault injection attack against that single SRAM cell may allow the attackers to enable the full debug functionality in that CPU core. To mitigate against such an attack, the central debug control block, after performing the local/remote authentication process described above, may use a bus to write a fixed data value of multiple bits with an equal number of zero and one bits to a large number of SRAM cells in each CPU core. A laser fault injection attack against these SRAM cells will flip certain bits, but the CPU core may be configured to not activate the full debug functionality unless all the SRAM cells contain the expected fixed data value. Because the attacker cannot fully control individual SRAM cell bits through the fault injection attack for the reasons described above, this mitigation is effective against these types of laser fault injection attacks.

Yet another method for protecting a processing device against a laser fault injection attack may include altering the physical or chemical composition of the processing device. For example, the physical composition of a portion of the silicon or die 104 of the CPU 101 to include chemical elements (e.g., metals such as copper) that interact with the electromagnetic radiation emitted as part of a laser fault injection attack. In another example, the CPU 101 may be manufactured with an additional layer between the components of the CPU 101 and the IHS that includes the chemical elements. In either example, the additional chemical elements may block or reduce the electromagnetic radiation from the laser to make the attack less efficient through electromagnetic radiation absorption or reflection. In the example of the additional layer included in the CPU 101, the CPU package 102 may be manufactured such that removal of the additional layer causes irreversible physical damage to the CPU die 104.

Figure 7:
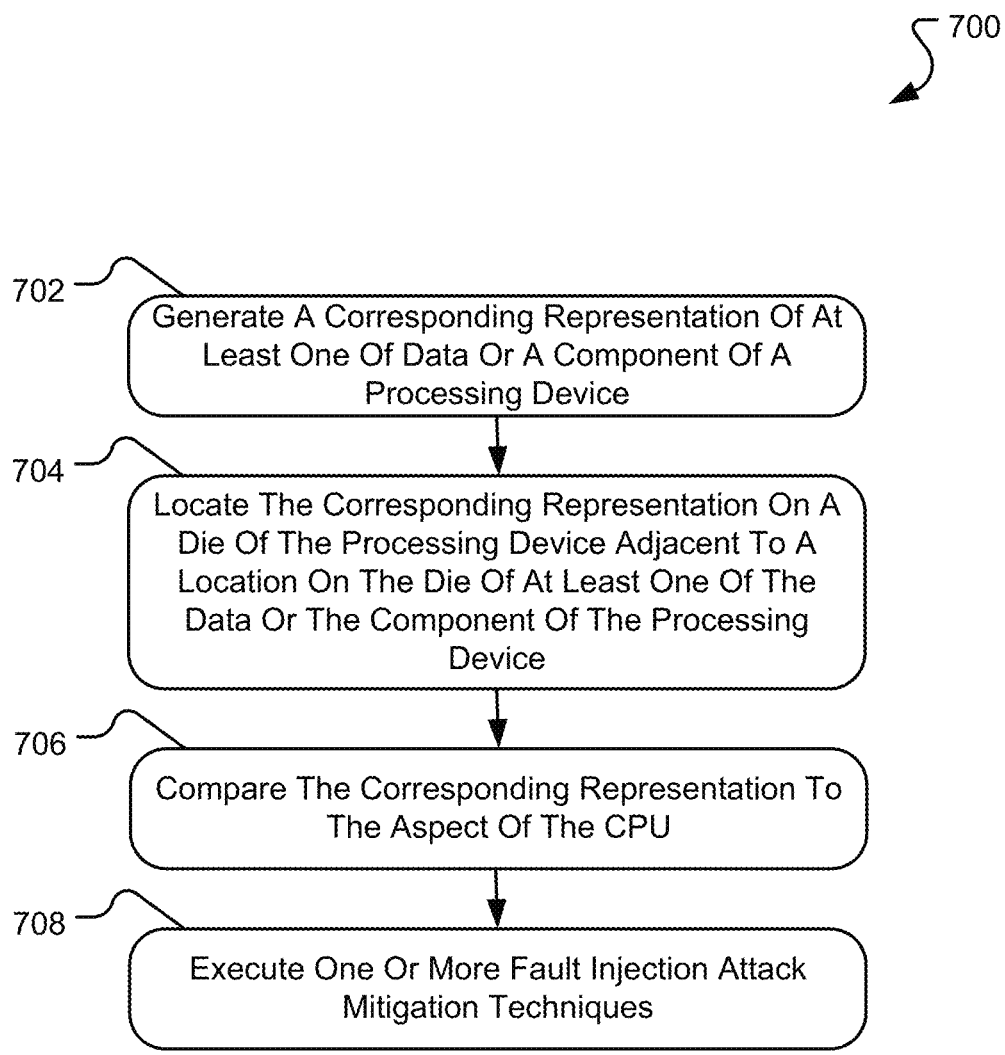
FIG. 7 is a flowchart illustrating an example of a method (or process) for mitigating a fault injection attack on an aspect of a processing device, in accordance with aspects of the disclosure.

FIG. 7 is a flowchart of a method for mitigating a fault injection attack on a component of a processing device in accordance with one illustrative example. The method may include, at operation 702, generating a representation of at least one of data or a component of a processing device (e.g., data of the processing device, at least one component of the processing device, or both data and a component of the processing device), such as CPU 101, that corresponds to the data and/or the component of the processing device. For example, the method may include generating a hash value of a block of data processed or stored by the CPU 101 from a secure hashing function. The block of data may be static data (data stored in static mechanisms of the CPU 101) or dynamic data (data that changes over time, such as register data or data stored in one or more memory components of the CPU). In another example, the component of the processing device (e.g., the CPU 101) may be one or more interconnected logic blocks or gates of the CPU and the corresponding representation of the logic block may comprise a redundant logic block comprising one or more of redundant interconnected logic blocks. The redundant logic block may process an input data stream in a similar manner as the logic block.

At operation 704, the method can include locating the corresponding representation on a die of the processing device (e.g., the CPU die 104) adjacent to or near a location on the die of at least one of the data or the component of the processing device. In the example of the corresponding representation being a hashed value of a block of data, locating the representation adjacent to the data and/or component of the processing device may include storing the hashed value and the block of data in the same array of a memory. In another example, the hashed value and the block of data may be stored in adjacent areas within a memory component. In the example in which the corresponding representation is one or more redundant logic gates, the redundant gates may be located on the die of the processing device (e.g., the CPU die 104) intertwined with or adjacent to the logic gates of the logic block.

At operation 706, the method can include comparing the corresponding representation of the data and/or component of the processing device (e.g., CPU 101) to the actual data and/or component to determine if a fault injection attack has occurred on the data and/or component of the CPU. For example, a hash of the stored data may be compared with the stored hash value and, if the values are not the same, the stored data may have suffered a fault injection attack. Further, because the hash value and the target data are stored in a similar location on the CPU die 104, such an attack would affect both the stored hash value and the stored data. In another example, a fault injection attack may affect both logic block of the CPU 101 and the redundant logic block such that a comparison of an output from both the logic block and redundant logic block may indicate a fault injection attack as the outputs should be the same. If the comparison indicates that a fault injection attack has occurred on the data and/or component of the CPU 101, one or more mitigation techniques may be executed at operation 708 to prevent the CPU from consuming or otherwise processing the attacked data. In one example, the mitigation technique may include a reboot of the CPU 101 after disposing of the suspect data.

Figure 8:
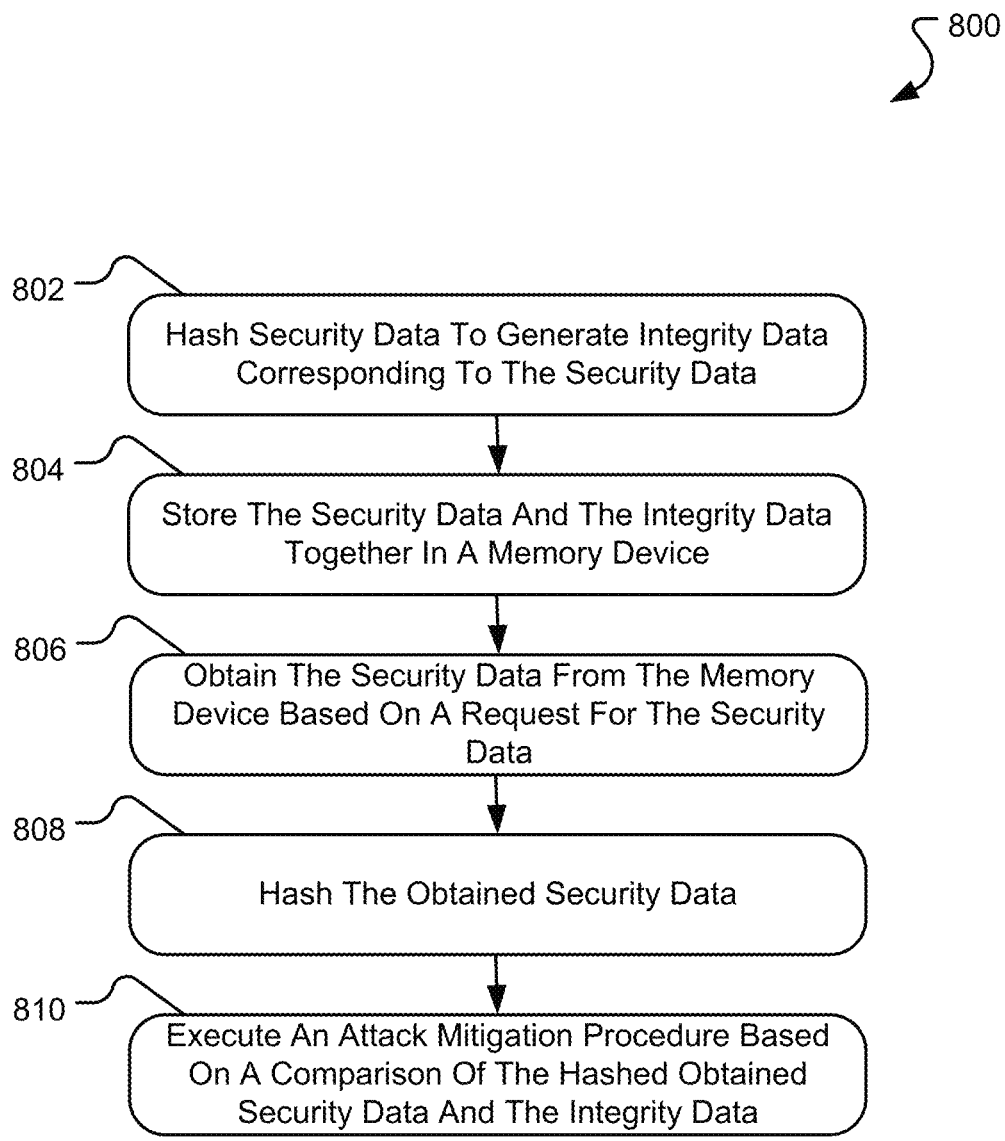
FIG. 8 is a flowchart illustrating an example of a method (or process) for mitigating a fault injection attack on security data of a processing device, in accordance with aspects of the disclosure.

FIG. 8 is a flowchart illustrating an example of a method (or process) 800 for mitigating a fault injection attack on security data of a processing device, in accordance with some examples. At operation 802, a hash value of a block of security data processed or stored by the CPU 101 may be generated through a secure hashing function. The hash value may be referred to as integrity data for the block of security data. The block of security data may be static data (data stored in static mechanisms of the CPU 101) or dynamic data (data that changes over time, such as register data or data stored in one or more memory components of the CPU) that is related to some security mechanism of the CPU, such as an encryption key, secure identifier, encryption key seed value, and the like. At operation 804, the hashed value, or integrity value, of a block of security data and the security data may be stored together in a memory device. In one example, the integrity data and the security data may be stored in the same memory array within a memory device.

In another example, the integrity data and the block of security data may be stored in adjacent areas within a memory component.

At operation 806, the method may obtain (e.g., retrieve, receive, or otherwise obtain) the security data from the memory component or device in response to a request for the security data. For example, a program (software or firmware) may be executed by the CPU 101 that requests security data from the memory component. At operation 808, the method may include hashing the obtained security data. For example, the method may generate a hash of the security data using the same hashing function as used above to generate the integrity data. At operation 810, the method may execute an attack mitigation procedure based on a comparison of the hashed obtained security data and the integrity data. In one example, the method may compare the hashed obtained security data to the integrity data stored in the memory component to determine if a fault injection attack has occurred on the security data of the CPU. For instance, if the hash of the security data and the integrity data are not the same, the stored security data may have suffered a fault injection attack and been changed. If the comparison indicates that a fault injection attack has occurred on the security data of the CPU 101, one or more mitigation techniques may be executed to prevent the CPU from consuming or otherwise processing the attacked data. In one example, the mitigation technique may include a reboot of the CPU 101 after disposing of the suspect data.

In some examples, the methods or processes described herein (e.g., method 300, method 400, method 500, method 700, method 800, and/or other process described herein) may be performed by a computing device or apparatus or by a component or multiple components of a computing device or apparatus. For instance, the method 300, method 400, method 500, method 700, and/or the method 800 can be performed by the CPU 101 of FIG. 1. The computing device can include any suitable device, such as a mobile device (e.g., a mobile phone), a desktop computing device, a tablet computing device, a server computer, a vehicle or computing device of a vehicle, a robotic device, a television, and/or any other computing device with the resource capabilities to perform the processes described herein, including the method 300, the method 400, the method 500, method 700, and the method 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or any other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes or methods described herein (e.g., method 300, method 400, method 500, method 700, and/or other process described herein) are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes or methods described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As used herein, the term "computer-readable medium" or "computer-readable storage medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flow diagram, a flowchart, a data flow diagram, a structure diagram, or a block diagram. Although a flow diagram may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" and "at least one of A or B" means A, B, or A and B. In another example, claim language reciting "at least one of A, B, and C" and "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" and "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of fault injection attack mitigation. The method may include the operations of generating a corresponding representation of at least one of data or a component of a processing device, locating the corresponding representation on a die of the processing device adjacent to a location on the die of at least one of the data or the component of the processing device, and executing, based on a determination that the corresponding representation is different than at least one of the data or the component of the processing device, a mitigation procedure by the processing device.

Aspect 2. The method of Aspect 1, wherein at least one of the data or the component of a processing device comprises security data and wherein generating the corresponding representation comprises hashing, using a secure hashing function, the security data to generate integrity data corresponding to the security data, the corresponding representation comprising the integrity data and storing the security data and the integrity data in a memory device in communication with the processing device.

Aspect 3. The method of Aspect 2, wherein storing the security data and the integrity data comprises interleaving at least a portion of the security data with at least a portion of the integrity data.

Aspect 4. The method of any of Aspects 1 to 3, wherein storing the security data and the integrity data comprises storing the security data in a first portion of the memory device and the integrity data in a second portion of the memory device, the second portion adjacent to the first portion adjacent to the second portion.

Aspect 5. The method of Aspect 4, wherein the second portion of the memory device is adjacent to the first portion of the memory device.

Aspect 6. The method of any of Aspects 1 to 5, further comprising obtaining the security data from the memory device, hashing, via the secure hashing function, the obtained security data, and comparing the hashed obtained security data to the integrity data.

Aspect 7. The method of Aspect 1, wherein at least one of the data or the component of the processing device comprises performance-dependent data and wherein generating the corresponding representation comprises generating, via a parity-generating function, integrity data corresponding to the performance-dependent data, the corresponding representation comprising the integrity data.

Aspect 8. The method of Aspect 7, wherein the parity-generating function comprises an error correction code function.

Aspect 9. The method of Aspect 7 or 8, further comprising storing the performance-dependent data and the integrity data in the same memory array of a memory device in communication with the processing device.

Aspect 10. The method of Aspect 1, wherein at least one of the data or the component of the processing device comprises a logic block of the processing device, the logic block comprising a plurality of interconnected logic gates, and the corresponding representation comprises a redundant logic block comprising at least a portion of the plurality of interconnected logic gates.

Aspect 11. The method of Aspect 10, wherein locating the corresponding representation on the die of the processing device includes locating the redundant logic block on the die, and wherein locating the redundant logic block on the die comprises interleaving at least one logic gate of the redundant logic block with at least a portion of the plurality of interconnected logic gates.

Aspect 12. The method of any of Aspects 1 to 11, wherein the location of the corresponding representation on a die of the processing device is within a predetermined distance from the location on the die of at least one of the data or the component of the processing device.

Aspect 13. The method of Aspect 12, wherein the predetermined distance corresponds to a diameter of a laser spot of a laser fault injection device.

Aspect 14. The method of any of Aspects 1 to 13, wherein the processing device is a central processing unit.

Aspect 15. An apparatus including at least one memory and at least one processor (e.g., configured in circuitry) coupled to the at least one memory, the at least one processor being configured to perform operations according to any of Aspects 1 to 14.

Aspect 16. A computer-readable storage medium storing instructions that, when executed by one or more processors, cause the one or more processors to perform operations according to any of Aspects 1 to 14.

Aspect 17. An apparatus for fault injection attack mitigation, comprising one or more means for performing operations according to any of Aspects 1 to 14.

Aspect 18. A processing device comprising a non-transitory computer-readable medium encoded with instructions. When the instructions are executed by the processing device, the processing device is configured to and can: hash, using a secure hashing function, security data to generate integrity data corresponding to the security data; store the security data and the integrity data in a memory device, the location of the integrity data on a die of the processing device unit adjacent to a location of the security data; obtain, based on a request, the security data from the memory device; hash, using the secure hashing function, the obtained security data; and execute, based on a comparison of the hashed obtained security data to the integrity data, a mitigation procedure.

Aspect 19. The processing device of Aspect 18, wherein storing the security data and the integrity data comprises interleaving at least a portion of the security data with at least a portion of the integrity data in the memory device.

Aspect 20. The processing device of Aspects 18 or 19, wherein storing the security data and the integrity data comprises storing the security data in a first portion of the memory device and the integrity data in a second portion of the memory device.

Aspect 21. The processing device of Aspect 20, wherein the second portion of the memory device is adjacent to the first portion of the memory device.

Aspect 22. The processing device of any of Aspects 18 to 21, wherein hashing the security data comprises generating, using a parity-generating function.

Aspect 23. The processing device of Aspect 19, wherein the parity-generating function comprises an error correction code function.

Aspect 24. The processing device of Aspect 18, wherein the processing device is a central processing unit.

Aspect 25. A method of any of Aspects 18 to 24.

Aspect 26. A computer-readable medium storing instructions that, when executed by a processing device, cause the processing device to perform operations according to any of Aspects 18 to 24.

Aspect 27. An apparatus for fault injection attack mitigation, comprising one or more means for performing operations according to any of Aspects 18 to 24.

Aspect 28. A computer-readable medium storing instructions that, when executed by a processing device, cause the processing device to perform operations according to any of Aspects 17 to 24.

I claim:

1. A method of fault injection attack mitigation, the method comprising:
   generating a corresponding representation of at least one of data or a component of a processing device;
   locating the corresponding representation on a die of the processing device adjacent to a location on the die of at least one of the data or the component of the processing device within a predetermined distance, the predetermined distance less than a diameter of a laser spot of a laser fault injection device to mitigate a fault injection attack from the laser fault injection device; and
   executing, based on a determination that the corresponding representation is different than at least one of the data or the component of the processing device, a mitigation procedure by the processing device.

2. The method of claim 1, wherein at least one of the data or the component of the processing device comprises security data and wherein generating the corresponding representation comprises:
   hashing, using a secure hashing function, the security data to generate integrity data corresponding to the security data, the corresponding representation comprising the integrity data; and
   storing the security data and the integrity data in a memory device in communication with the processing device.

3. The method of claim 2, wherein storing the security data and the integrity data comprises interleaving at least a portion of the security data with at least a portion of the integrity data.

4. The method of claim 2, wherein storing the security data and the integrity data comprises storing the security data in a first portion of the memory device and the integrity data in a second portion of the memory device.

5. The method of claim 4, wherein the second portion of the memory device is adjacent to the first portion of the memory device.

6. The method of claim 5, further comprising:
   obtaining the security data from the memory device;
   hashing, using the secure hashing function, the obtained security data; and
   comparing the hashed obtained security data to the integrity data.

7. The method of claim 1, wherein at least one of the data or the component of the processing device comprises performance-dependent data and wherein generating the corresponding representation comprises:
   generating, using a parity-generating function, integrity data corresponding to the performance-dependent data, the corresponding representation comprising the integrity data.

8. The method of claim 7, wherein the parity-generating function comprises an error correction code function.

9. The method of claim 8, further comprising:
   storing the performance-dependent data and the integrity data in a same memory array of a memory device in communication with the processing device.

10. The method of claim 1, wherein at least one of the data or the component of the processing device comprises a logic block of the processing device, the logic block comprising a plurality of interconnected logic gates, and the corresponding representation comprises a redundant logic block comprising at least a portion of the plurality of interconnected logic gates.

11. The method of claim 10, wherein locating the corresponding representation on the die of the processing device includes locating the redundant logic block on the die, and wherein locating the redundant logic block on the die comprises interleaving at least one logic gate of the redundant logic block with at least a portion of the plurality of interconnected logic gates.

12. A processing device, comprising:
   a non-transitory computer-readable medium encoded with instructions, which when executed by the processing device, causes the processing device to:
      hash, using a secure hashing function, security data to generate integrity data corresponding to the security data;
      store the security data and the integrity data in a memory device, a location of the integrity data on a die of the processing device within a predetermined distance to a location of the security data, the predetermined distance less than a diameter of a laser spot of a laser fault injection device to mitigate a fault injection attack from the laser fault injection device;

obtain, based on a request, the security data from the memory device;

hash, using the secure hashing function, the obtained security data to generate hashed security data; and execute, based on a comparison of the hashed security data to the integrity data, a mitigation procedure.

13. The processing device of claim 12, wherein storing the security data and the integrity data comprises interleaving at least a portion of the security data with at least a portion of the integrity data in the memory device.

14. The processing device of claim 13, wherein storing the security data and the integrity data comprises storing the security data in a first portion of the memory device and the integrity data in a second portion of the memory device.

15. The processing device of claim 14, wherein the second portion of the memory device is adjacent to the first portion of the memory device.

16. The processing device of claim 12, wherein the processing device is a central processing unit.

17. A non-transitory computer-readable medium storing instructions that, when executed by a processing device, cause the processing device to: hash, using a secure hashing function, security data to generate integrity data corresponding to the security data; store the security data and the integrity data in a memory device, a location of the integrity data on a die of the processing device within a predetermined distance to a location of the security data, the predetermined distance less than a diameter of a laser spot of a laser fault injection device to mitigate a fault injection attack from the laser fault injection device; obtain, based on a request, the security data from the memory device; hash, using the secure hashing function, the obtained security data; and execute, based on a comparison of the hashed obtained security data to the integrity data, a mitigation procedure.

18. The non-transitory computer-readable medium of claim 17, wherein storing the security data and the integrity data comprises interleaving at least a portion of the security data with at least a portion of the integrity data in the memory device.

* * * * *